(12) United States Patent
Cox et al.

(10) Patent No.: US 12,549,074 B2
(45) Date of Patent: Feb. 10, 2026

(54) HIGH-POWERED POWER TOOL SYSTEM

(71) Applicant: BLACK & DECKER INC., New Britain, CT (US)

(72) Inventors: John D. Cox, Lutherville, MD (US); Michael Varipatis, Fallston, MD (US); Matthew J. Velderman, Baltimore, MD (US); Christopher W. Shook, Bel Air, MD (US)

(73) Assignee: Black & Decker Inc., New Britain, CT (US)

( * ) Notice: Subject to any disclaimer, the term of this patent is extended or adjusted under 35 U.S.C. 154(b) by 60 days.

(21) Appl. No.: 18/438,941

(22) Filed: Feb. 12, 2024

(65) Prior Publication Data

US 2024/0258883 A1  Aug. 1, 2024

Related U.S. Application Data

(62) Division of application No. 17/075,297, filed on Oct. 20, 2020, now Pat. No. 11,936,248.
(Continued)

(51) Int. Cl.
*H02K 11/00* (2016.01)
*B25F 5/02* (2006.01)
(Continued)

(52) U.S. Cl.
CPC ............ *H02K 11/0094* (2013.01); *B25F 5/02* (2013.01); *H01M 50/20* (2021.01);
(Continued)

(58) Field of Classification Search
CPC .... H02K 11/0094; H02K 7/145; H02K 11/30; H02K 21/14; B25F 5/02; B25F 5/00;
(Continued)

(56) References Cited

U.S. PATENT DOCUMENTS

2016/0020443 A1  1/2016  White et al.
2019/0006980 A1  1/2019  Sheeks et al.

FOREIGN PATENT DOCUMENTS

EP    2003760 A2   12/2008
WO    2019023379 A1   1/2019

OTHER PUBLICATIONS

Extended European Search Report, EP Application No. 20203129.0, Mar. 22, 2021, 9 pages, EPO.

*Primary Examiner* — Christopher M Koehler
*Assistant Examiner* — Viswanathan Subramanian
(74) *Attorney, Agent, or Firm* — Brake Hughes Bellermann LLP

(57) ABSTRACT

A power tool system includes a power tool having a tool housing. The tool housing includes a battery pack receptacle having a set of tool terminals. A brushless motor includes an output shaft operably coupled to drive a tool element, a stator having an outer diameter of approximately 60 mm to approximately 80 mm, and a stack length of approximately 75% to approximately 125% of the outer diameter of the stator. A controller is operably connected to the set of tool terminals and to the brushless motor to control power delivery to the brushless motor. A battery pack includes a battery pack housing connectable to the battery pack receptacle on the tool housing and a set of battery cells. The set of battery cells includes at least 15 battery cells each having a nominal voltage of approximately 3.6V and an impedance of approximately ≤13 mΩ. A set of battery pack terminals is connectable to the set of tool terminals. The battery pack has a nominal voltage of at least approximately 54V and the brushless motor is operable under load to output a power of between approximately 3000 W and approximately 5000 W.

13 Claims, 23 Drawing Sheets

Related U.S. Application Data

(60) Provisional application No. 62/924,543, filed on Oct. 22, 2019.

(51) Int. Cl.
*H01M 50/20* (2021.01)
*H01M 50/543* (2021.01)
*H02K 7/14* (2006.01)
*H02K 11/30* (2016.01)
*H02K 21/14* (2006.01)
*B28D 1/02* (2006.01)

(52) U.S. Cl.
CPC .......... *H01M 50/543* (2021.01); *H02K 7/145* (2013.01); *H02K 11/30* (2016.01); *H02K 21/14* (2013.01); *B28D 1/02* (2013.01); *H01M 2220/30* (2013.01)

(58) Field of Classification Search
CPC ............... H01M 50/20; H01M 50/543; H01M 2220/30; B28D 1/02; Y02E 60/10
See application file for complete search history.

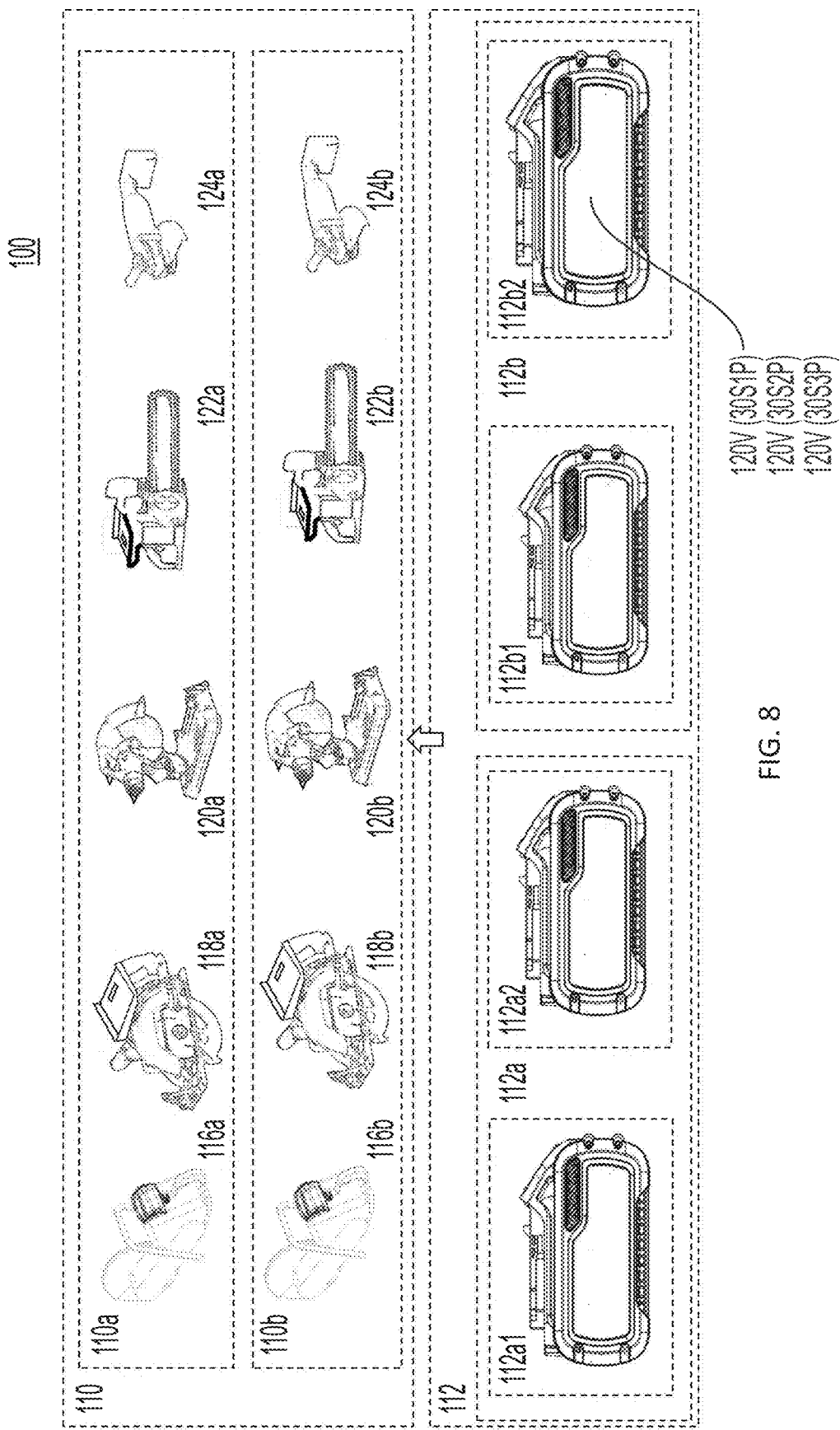

| Power Source | Code | Time | Torque | RPM | Volts | Amps | Watts IN | Watts OUT | Efficiency |
|---|---|---|---|---|---|---|---|---|---|
| 15S1P | Limits | 16.712 | 57.99 | 4347 | 45.122 | 78.054 | 3513.59 | 2982.576 | 84.887 |
| 15S2P | Limits | 17.428 | 60.52 | 4959 | 52.28 | 80.197 | 4188.63 | 3550.927 | 84.775 |
| 15S3P | Limits | 17.686 | 61.39 | 5150 | 55.014 | 79.991 | 4396.11 | 3740.706 | 85.091 |

HIGH-POWERED POWER TOOL SYSTEM

CROSS-REFERENCE TO RELATED APPLICATION

This application is a divisional of and claims priority to U.S. Non-Provisional patent application Ser. No. 17/075,297, filed Oct. 20, 2020, titled, "High-Powered Power Tool System," which in turn claims the benefit of U.S. Provisional Patent Application No. 62/924,543 filed on Oct. 22, 2019, which is incorporated herein by reference in its entirety.

TECHNICAL FIELD

This description relates to a high-powered power tool system.

BACKGROUND

Various types of electric power tools are commonly used in construction, home improvement, outdoor, and do-it-yourself projects. Power tools generally fall into three categories—AC power tools (often also called corded power tools) that can operate using one or more AC power supplies (such as AC mains or a generator), DC power tools (often also called cordless power tools) that can operate using one or more DC power supplies (such as one or more removable and rechargeable battery packs), and gasoline powered power tools that can operate using an internal combustion engine.

Corded or AC (alternating current) power tools have typically been used for heavy duty applications, such as heavy duty sawing, heavy duty drilling and hammering, and heavy duty metal working, that require higher power and/or require longer time to complete the task, as compared to relatively light duty applications that have typically been completed by cordless power tools. However, as their name implies, corded tools require the use of a cord that must be connected to an AC power supply. In many applications, such as on construction sites, it is not practical to connect to an AC power supply and/or AC power must be generated by a separate AC power generator, e.g., a gasoline powered generator. In addition, the power output from AC power tools can be limited by the amount of current that can be drawn before a circuit breaker is tripped (e.g., approximately 15 amps).

Cordless or DC (direct current) power tools have typically been used for lighter duty applications, such as light duty sawing, light duty drilling, fastening, that require lower power and/or require shorter time to complete the task, as compared to relatively heavy duty applications that have typically been completed by corded power tools. Because cordless power tools may have been more limited in their power and/or runtime, they have not generally been accepted by the industry for many of the heavier duty applications. Cordless power tools are also limited by weight since the higher voltage and/or capacity batteries tend to have greater weight, creating an ergonomic disadvantage.

AC power tools and DC power tools may also operate using many different types of motors and motor control circuits. For example, corded or AC power tools may operate using an AC brushed motor, a universal brushed motor (that can operate using AC or DC), or a brushless motor. The motor in a corded tool may have its construction optimized or rated to run on an AC voltage source having a rated voltage that is approximately the same as AC mains (e.g., 120V in the United States, 230V in much of Europe). The motors in AC or corded tools generally are controlled using an AC control circuit that may contain an on-off switch (e.g., for tools operating at substantially constant no-load speed) or using a variable speed control circuit such as a triac control circuit (e.g., for motors tools operating at a variable no-load speed). An example of a triac control circuit can be found in U.S. Pat. No. 7,928,673, which is incorporated by reference.

Cordless or DC power tools also may operate using many different types of motors and control circuits. For example, cordless or DC power tools may operate using a DC brushed motor, a universal brushed motor, or a brushless motor. Since the batteries of cordless power tools tend to be at a lower nominal voltage than the AC mains (e.g., 12V, 20V, 40V, 60V, etc.), the motors for cordless or DC power tools generally have their construction optimized for use with a DC power supply having one or more of these lower voltages. Control circuits for cordless or DC power tools may include an on-off switch (e.g., for tools operating at substantially constant no-load speed) or a variable speed control circuit (e.g., for tools operating at a variable no-load speed). A variable speed control circuit may comprise, e.g., an analog voltage regulator or a digital pulse-width-modulation (PWM) control to control power delivery to the motor. An example of a PWM control circuit can be found in U.S. Pat. No. 7,821,217, which is incorporated by reference.

Gasoline powered power tools have typically been used for very heavy duty applications that require very high power output, such as concrete cutting. However, these tools require the use of gasoline for their power, which can be messy, costly, and create emissions that are detrimental to the environment.

It is desirable to provide high powered cordless power tools that are capable of such heavy duty applications, lighter duty applications, and very heavy duty applications.

SUMMARY

According to one general aspect, a power tool system includes a power tool having a tool housing. The tool housing includes a battery pack receptacle and the battery pack receptacle includes a set of tool terminals. The power tool includes a brushless motor that is disposed in the tool housing. The brushless motor includes an output shaft operably coupled to drive a tool element, a stator having an outer diameter of approximately 60 mm to approximately 80 mm, and a stack length of approximately 75% to approximately 125% of the outer diameter of the stator. The power tool includes a controller that is disposed in the tool housing and is operably connected to the set of tool terminals and to the brushless motor to control power delivery to the brushless motor. The power tool system includes a battery pack. The battery pack includes a battery pack housing operably connectable to the battery pack receptacle on the tool housing, a set of battery cells disposed in the battery pack housing, where the set of battery cells include at least 15 battery cells each having a nominal voltage of approximately 3.6V and an impedance of approximately ≤13 mΩ, and a set of battery pack terminals electrically connectable to the set of tool terminals. The battery pack has a nominal voltage of at least approximately 54V and the brushless motor is operable under load to output a power of between approximately 3000 W and approximately 5000 W.

Implementations may include one or more of the following features. For example, the battery pack may define a volume of the battery pack of up to about $1.0 \times 10^6$ mm³. The set of battery cells may include 21700-model battery cells.

In some example implementations, the set of battery cells may include at least 20 battery cells each having a nominal voltage of approximately 3.6V and the battery pack may have a nominal voltage of at least approximately 72V.

In some example implementations, the set of battery cells may include at least 30 battery cells each having a nominal voltage of approximately 3.6V and the battery pack may have a nominal voltage of approximately 54V to approximately 108V.

In some example implementations, at least a portion of the battery cells may be connected in series.

In some example implementations, the battery cells may include a first string of at least 15 battery cells, each battery cell having a nominal voltage of approximately 3.6V, with the at least 15 battery cells connected in series. The battery cells may include a second string of at least 15 battery cells, each battery cell having a nominal voltage of approximately 3.6V, with the at least 15 battery cells connected in series. The first string of battery cells may be connected in parallel to the second string of battery cells.

In some implementations, the battery cells may include a first string of at least 15 battery cells, each battery cell having a nominal voltage of approximately 3.6V, with the at least 15 battery cells connected in series. The battery cells may include a second string of at least 15 battery cells, each battery cell having a nominal voltage of approximately 3.6V, with the at least 15 battery cells connected in series. The battery cells may include a third string of at least 15 battery cells, each battery cell having a nominal voltage of approximately 3.6V, with the at least 15 battery cells connected in series. The first string of battery cells, the second string of battery cells, and the third string of battery cells may be connected in parallel.

In some implementations, the power tool system may include a first battery pack and a second battery pack. The first battery pack may include a first battery pack housing that is operably connectable to the battery pack receptacle on the tool housing. The first battery pack may include a set of battery cells disposed in the first battery pack housing, the set of battery cells including at least 15 battery cells each having a nominal voltage of approximately 3.6V and an impedance of approximately ≤13 mΩ, and a set of first battery pack terminals electrically connectable to the set of tool terminals, where the first battery pack may have a nominal voltage of at least approximately 54V The second battery pack may include a second battery pack housing that is operably connectable to the battery pack receptacle on the tool housing, the second battery pack includes a set of battery cells disposed in the second battery pack housing, the set of battery cells including at least 15 battery cells each having a nominal voltage of approximately 3.6V and an impedance of ≤13 mΩ, and a set of second battery pack terminals electrically connectable to the set of tool terminals, with the second battery pack having a nominal voltage of at least approximately 54V In some implementations, the first battery pack may be electrically connected in parallel to the second battery pack. In some implementations, the first battery pack and the second battery pack may be electrically connected in series. In some implementations, the set of battery cells in the first battery pack and the set of battery cells in the second battery pack may include 21700-model battery cells.

In some implementations, the power tool may be a concrete saw. The outer diameter of the stator of the brushless motor may be approximately 61 mm and the stack length of the brushless motor may be approximately 60 mm.

The brushless motor may be operable under load to output a power of approximately 3000 W.

In some implementations, the brushless motor may be operable under load to output a power of greater than approximately 5000 W.

In another general aspect, a power tool system includes a power tool having a tool housing. The tool housing includes a battery pack receptacle and the battery pack receptacle includes a set of tool terminals. The power tool includes a brushless motor is disposed in the tool housing. The brushless motor includes an output shaft operably coupled to drive a tool element, a stator having an outer diameter of approximately 60 mm to approximately 80 mm, and a stack length of approximately 75% to approximately 125% of the outer diameter of the stator. The power tool includes a controller disposed in the tool housing operably connected to the set of tool terminals and to the brushless motor to control power delivery to the brushless motor. The power tool system includes a battery pack. The battery pack includes a battery pack housing operably connectable to the battery pack receptacle on the tool housing, a set of battery cells disposed in the battery pack housing, the set of battery cells including at least 20 battery cells each having a nominal voltage of approximately 3.6V and an impedance of approximately ≤20 mΩ, and a set of battery pack terminals electrically connectable to the set of tool terminals. The battery pack has a nominal voltage of at least approximately 54V, and the brushless motor is operable under load to output a power of between approximately 3000 W and approximately 5000 W.

Implementations may include one or more of the following features. For example, the set of battery cells may include 21700-model battery cells.

In some implementations, the battery pack may have a nominal voltage of at least approximately 72V.

In some implementations, the set of battery cells may include at least 30 battery cells each having a nominal voltage of approximately 3.6V and the battery pack may have a nominal voltage of approximately 54V to approximately 108V In some implementations, at least a portion of the battery cells may be connected in series.

In some implementations, the battery cells may include a first string of at least 20 battery cells, each battery cell having a nominal voltage of approximately 3.6V, with the at least 20 battery cells connected in series. The battery cells may include a second string of at least 20 battery cells, each battery cell having a nominal voltage of approximately 3.6V, with the at least 20 battery cells connected in series. The first string of battery cells may be connected in parallel to the second string of battery cells.

In some implementations, the battery cells may include a first string of at least 20 battery cells, each battery cell having a nominal voltage of approximately 3.6V, with the at least 20 battery cells connected in series, a second string of at least 20 battery cells, each battery cell having a nominal voltage of approximately 3.6V, with the at least 20 battery cells connected in series, and a third string of at least 20 battery cells, each battery cell having a nominal voltage of approximately 3.6V, with the at least 20 battery cells connected in series. The first string of battery cells, the second string of battery cells, and the third string of battery cells may be connected in parallel.

In some implementations, the power tool may include a first battery pack and a second battery pack. The first battery pack may include a first battery pack housing that is operably connectable to the battery pack receptacle on the tool housing. The first battery pack may include a set of battery cells disposed in the first battery pack housing, the set of battery cells including at least 20 battery cells each having a nominal voltage of approximately 3.6V and an impedance of approximately ≤20 mΩ, and a set of first battery pack terminals electrically connectable to the set of tool terminals. The first battery pack may have a nominal voltage of at least approximately 54V. The second battery pack may include a second battery pack housing that is operably connectable to the battery pack receptacle on the tool housing. The second battery pack may include a set of battery cells disposed in the second battery pack housing, the set of battery cells including at least 20 battery cells each having a nominal voltage of approximately 3.6V and an impedance of approximately ≤20 mΩ, and a set of second battery pack terminals electrically connectable to the set of tool terminals. The second battery pack may have a nominal voltage of at least approximately 54V In some implementations, the first battery pack may be electrically connected in parallel to the second battery pack. In some implementations, the first battery pack and the second battery pack may be electrically connected in series.

In some implementations, the set of battery cells in the first battery pack and the set of battery cells in the second battery pack may include 21700-model battery cells.

In some implementations, the power tool may be a concrete saw. The outer diameter of the stator of the brushless motor may be approximately 61 mm and the stack length of the brushless motor may be approximately 60 mm. The brushless motor may be operable under load to output a power of approximately 3000 W.

In some implementations, the brushless motor may be operable under load to output a power of greater than approximately 5000 W.

The details of one or more implementations are set forth in the accompanying drawings and the description below. Other features will be apparent from the description and drawings, and from the claims.

BRIEF DESCRIPTION OF THE DRAWINGS

FIG. 8 illustrates a first example embodiment of a power tool system.

FIG. 18 is a table of example test results for an example power tool.

DETAILED DESCRIPTION

Figure 1:
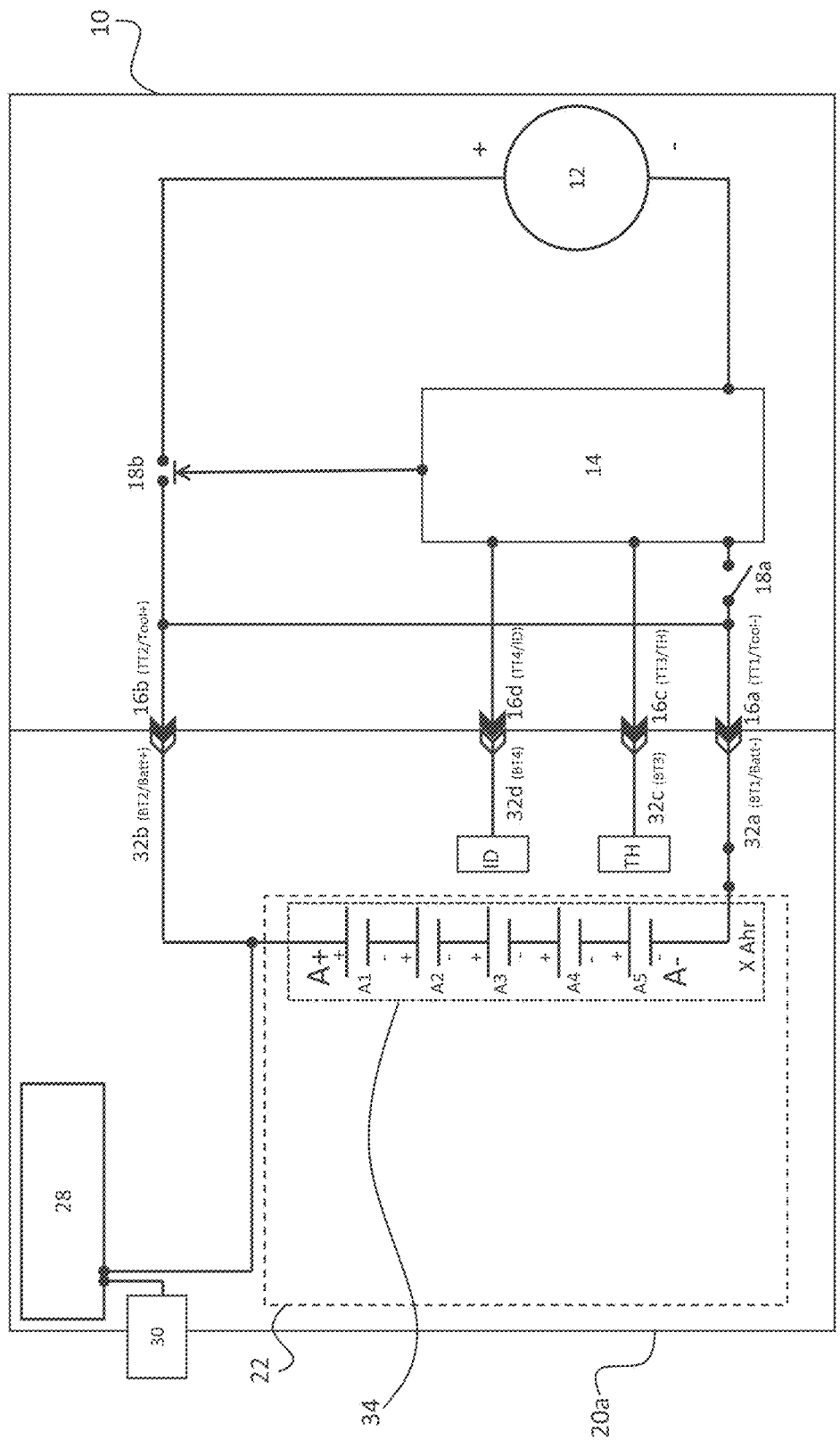
FIG. 1 is a schematic diagram of a first example embodiment of a power tool and a battery pack.

Each of the power tools and battery packs discussed in this patent application may be said to have a rated voltage. As used in this application, rated voltage may refer to an advertised voltage. The advertised/rated voltage may encompass a single voltage, several discrete voltages, or one or more ranges of voltages. As used in the application, rated voltage may refer to any of these types of voltages or a range of any of these types of voltages.

With respect to power tools and battery packs, the advertised voltage generally refers to a voltage that is designated on labels, packaging, user manuals, instructions, advertising, marketing, or other supporting documents for these products by a manufacturer or seller so that a user is informed which power tools and battery packs will operate with one another. The advertised voltage may include a numeric voltage value, or another word, phrase, alphanumeric character combination, icon, or logo that indicates to the user which power tools and battery packs will work with one another. In some embodiments, as discussed below, a power tool and a battery pack may have a single advertised voltage (e.g., 20V, 18V), a range of advertised voltages (e.g., 20V-60V), a plurality of discrete advertised voltages (e.g., 20V/60V), or an alphanumeric designation (e.g., 20V MAX, M18). As discussed further below, a power tool may also be advertised or labeled with a designation that indicates that it will operate with both a DC power supply and an AC power supply (e.g., AC/DC or AC/60V). An AC power supply may also be said to have an advertised voltage, which is the voltage that is generally known in common parlance to be the AC mains voltage in a given country (e.g., 120 VAC in the United States and 220 VAC-240 VAC in Europe).

For a battery cell, the operating voltage generally refers to a voltage range the battery cell manufacturer suggest to operate the battery cell for safety and reliability purposes (e.g., for Li-ion battery cells using an open circuit, i.e., unloaded, the operating voltage range may be 2.75 volts to 4.2 volts per cell). For a battery pack, the operating voltage generally refers to the DC voltage range at which the battery pack is designed by the battery pack manufacturer to operate (also sometimes referred to as controlled voltage) for safety and reliability purposes. For example, a battery pack having Li-ion battery cells advertised as a 20V battery pack may have an operating voltage range of 13.75 volts to 20.5 volts. Also, a battery pack having Li-ion battery cells advertised as a 20V battery pack, with an operating voltage of 13.75 volts to 20.5 volts, may have a nominal voltage of 18V For a battery cell, nominal voltage generally refers to the voltage of the battery cell at fifty percent (50%) of its state of charge (SOC). For a Li-ion battery cell, this is about between 3.6 volts and about 3.7 volts. For a battery pack, nominal voltage generally refers to the voltage of the battery pack at fifty percent (50%) of its SOC. Of course, for a battery pack, the nominal voltage will depend upon the number of cells and the manner in which the cells are electrically connected to each other.

The amount of charge stored in a battery cell or the capacity of a battery cell or the battery cell capacity may be measured in Ampere Hours or Amp Hours (AHr). A battery cell may have, for example, capacity of 1 AHr. This indicates that the battery cell will be able to continuously provide a current of 1 Amp for 1 hour. As is well known, while connecting a set of battery cells in series does alter the voltage of the connected set of cells, it does not alter the capacity of the connected set of cells. As is also well known, while connecting a set of battery cells in parallel does not alter the voltage of the connected set of cells, it does alter the capacity of the connected set of cells. For example, two battery cells, each having a nominal voltage of 3.6 V and a capacity of 1 AHr, when connected in series will have a combined voltage of 7.2 V and a combined capacity of 1 AHr and when connected in parallel will have a combined voltage of 3.6 V and a combined capacity of 2 AHr.

FIG. 1 illustrates an example embodiment of a combination of a power tool 10 and a battery pack 20a.

The power tool 10 may have, for example, an operating voltage of 18 volts. The battery pack 20a may have, for example, an operating or nominal voltage of 18 volts. The power tool 10 includes, among other components not illustrated for the sake of simplicity, a motor 12 having a positive terminal and a negative terminal. The power tool 10 also includes a tool control module 14. The power tool 10 also includes a plurality of tool terminals 16 (TT1, TT2, TT3, TT4). The tool terminals 16 include a negative power terminal 16a (TT1/Tool−) and a positive power terminal 16b (TT2/Tool+). The tool terminals 16 also include a first signal terminal 16c (TT3/TH) and a second signal terminal 16d (TT4/TD). The power tool 10 also includes a first (trigger) switch 18a and a second (control) switch 18b. The tool control module 14 controls operation of the motor 12.

The battery pack 20a includes, among other components not illustrated for the sake of simplicity, a set 22 of battery cells. The set 22 of battery cells includes at least one individual battery cell. The pack 20a also includes an identification (ID) circuit 24 and a temperature sensor (TH) circuit 26. The pack also includes a pack control module 28. The pack 20a also includes a state-of-charge (SOC) switch 30. The pack 20 also includes a plurality of battery pack terminals 32 (BT1, BT2, BT3, BT4). The battery terminals 32 include a negative power terminal 32a (BT1/Batt−) and a positive power terminal 32b (BT2/Batt+). The battery terminals 32 also include a first signal terminal 32c (BT3/TH) and a second signal terminal 32d (BT4/ID).

With regard to the tool 10, a first terminal of the first switch 18a is coupled to the tool negative power terminal 16a and a second terminal of the first switch 18a is coupled to a first terminal of the tool control module 14. A first terminal of the second switch is coupled to the tool positive power terminal 16d, a second terminal of the second switch 18b is coupled to the positive terminal of the motor and a third (control) terminal of the second switch 18b is coupled to a second terminal of the tool control module 14. The first signal terminal 16c is coupled to a third terminal of the tool control module 14 and the second terminal 16d is coupled to a fourth terminal of the tool control module 14.

With regard to the battery pack 20a, the temperature sensor circuit (TH) 26 may include a thermistor placed near one or more heat generating components of the battery pack 20a, for example, a FET or a battery cell. The temperature sensor circuit 26 is coupled to the first battery signal terminal 32c. The ID circuit 24 may include a voltage divider circuit to particularly identify the battery pack 20a and its characteristics, including but not limited to, nominal voltage, type of battery cell including configuration and chemistry, number of battery cells and their configuration. The ID circuit 24 is coupled to the second battery signal terminal 32d.

In the particular example embodiment illustrated in FIG. 1, there are a plurality (e.g., five) of individual battery cells—A1, A2, A3, A4, A5. Each individual battery cell A includes a positive terminal (+) and negative terminal (−). In this particular example embodiment, the plurality of individual battery cells A1-A5 are electrically connected in series in a first (A) string 34 of battery cells A1-A5. The A string 34 of battery cells A1-A5 includes a negative string terminal A− and a positive string terminal A+. The negative string terminal A− is coupled to the pack negative power terminal 32a and the positive string terminal A+ is coupled to the pack positive power terminal 32b. The battery pack control module 28 is coupled to the A string 34 to receive information regarding the status and health of the A string 34 and the individual battery cells A1-A5 of the A string 34.

In operation, the battery pack 20a is coupled to the power tool 10. The battery pack power terminals 32a, 32b are coupled to the power tool power terminals 16a, 16b, respectively. The battery pack signal terminals 32c, 32d are coupled to the power tool signal terminals 16c, 16d, respectively. If the information received by the tool control module 14 from the battery pack 20 indicates the battery pack 20a is in good working order and able to provide power to the power tool, the tool control module 14 closes the control switch 18b and connects the tool positive power terminal 16b to the motor 12. To operate the tool 10, a user may activate trigger switch 18a to electrically couple the tool negative terminal 16a to the tool control module 14 and effectively couple the battery pack to the motor 12. The tool control module 14 monitors the battery pack 20a status via the ID circuit 24 and the thermistor circuit 26. If the tool control module 14 determines that the battery pack or any of its components are out of operating range, the tool control module 14 will open the control switch 18b to stop operation of the tool.

In this example embodiment, each individual battery cell A has a nominal voltage of approximately about 3.6 v to about 3.7 v. Furthermore, each individual battery cell A has an impedance of approximately about 13 mΩ to approximately about 20 mΩ. Furthermore, each individual battery cell A has a capacity of approximately about 1 AHr. to approximately about 6 AHr.

Figure 2:
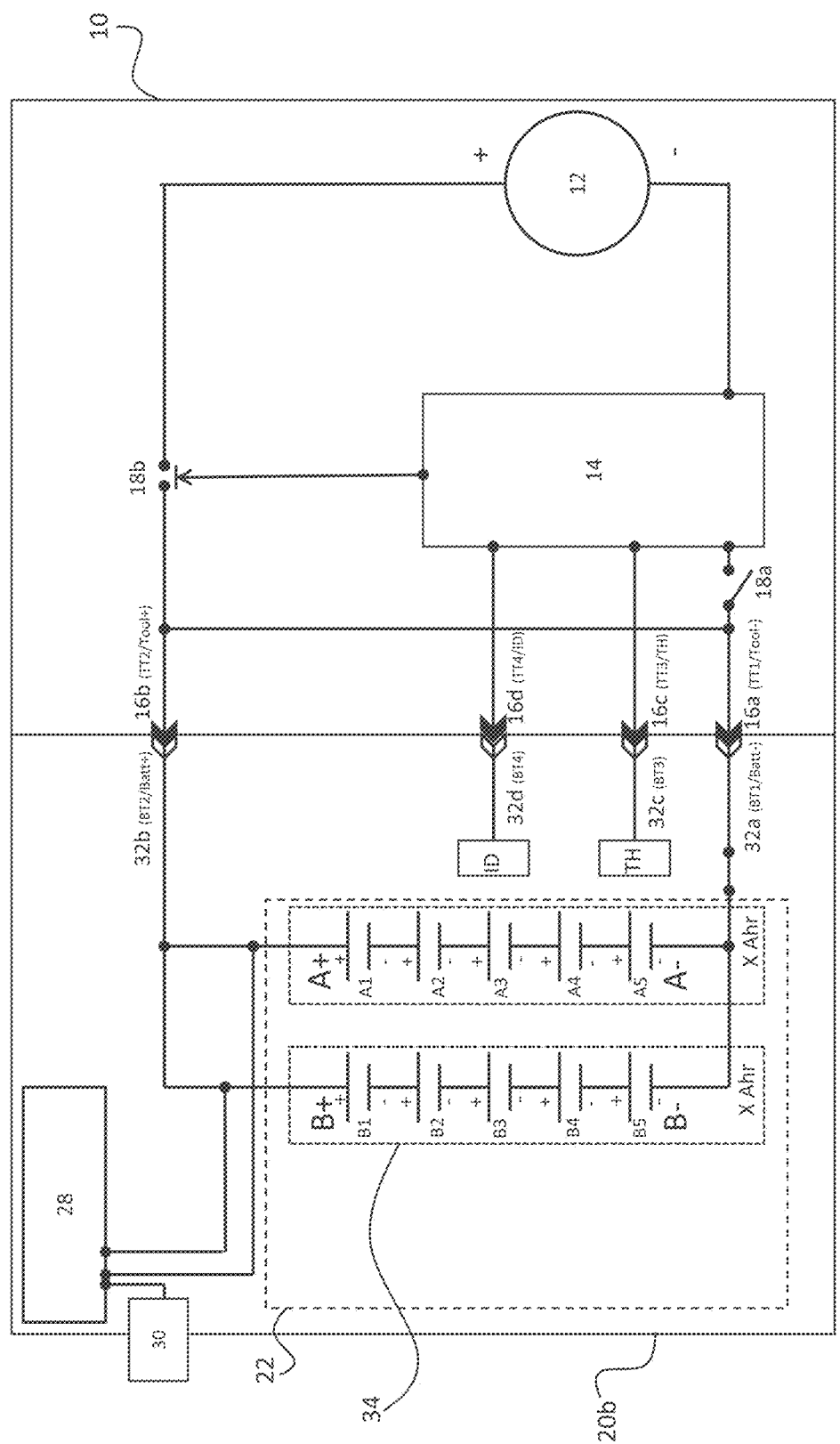
FIG. 2 is a schematic diagram of a second example embodiment of a power tool and battery pack.

FIG. 2 illustrates another example embodiment of a combination of a power tool 10 and a battery pack 20b. The power tool 10 of FIG. 2 is the same or similar power tool 10 of FIG. 1. The battery pack 20b is similar to the battery pack 20a of FIG. 1 except in the particular example embodiment illustrated in FIG. 2, there is a second plurality (e.g., five) of individual battery cells–B1, B2, B3, B4, B5. Each individual battery cell B includes a positive terminal (+) and negative terminal (−). In this particular example embodiment, the plurality of individual battery cells B1-B5 are electrically connected in series in a second (B) string 34 of battery cells B1-B5. The B string 34 of battery cells B1-B5 includes a negative string terminal B− and a positive string terminal B+. The negative string terminal B− is coupled to the negative string terminal A− and the pack negative power terminal 32a and the positive string terminal B+ is coupled to the positive string terminal A+ and the pack positive power terminal 32b. As such, the A string 34 and the B string 34 are electrically coupled in parallel. The battery pack control module 28 is also coupled to the B string 34 to receive information regarding the status and health of the B string 34 and the individual battery cells B1-B5 of the B string 34. As such, the set 22 of battery cells includes two strings 34 of battery cells.

In this example embodiment, each individual battery cell A has a nominal voltage of approximately about 3.6 v to about 3.7 v. Furthermore, each individual battery cell A has an impedance of approximately about 13 mΩ to approximately about 20 mΩ. Furthermore, each individual battery cell A has a capacity of approximately about 1 AHr. to approximately about 6 AHr.

Figure 3:
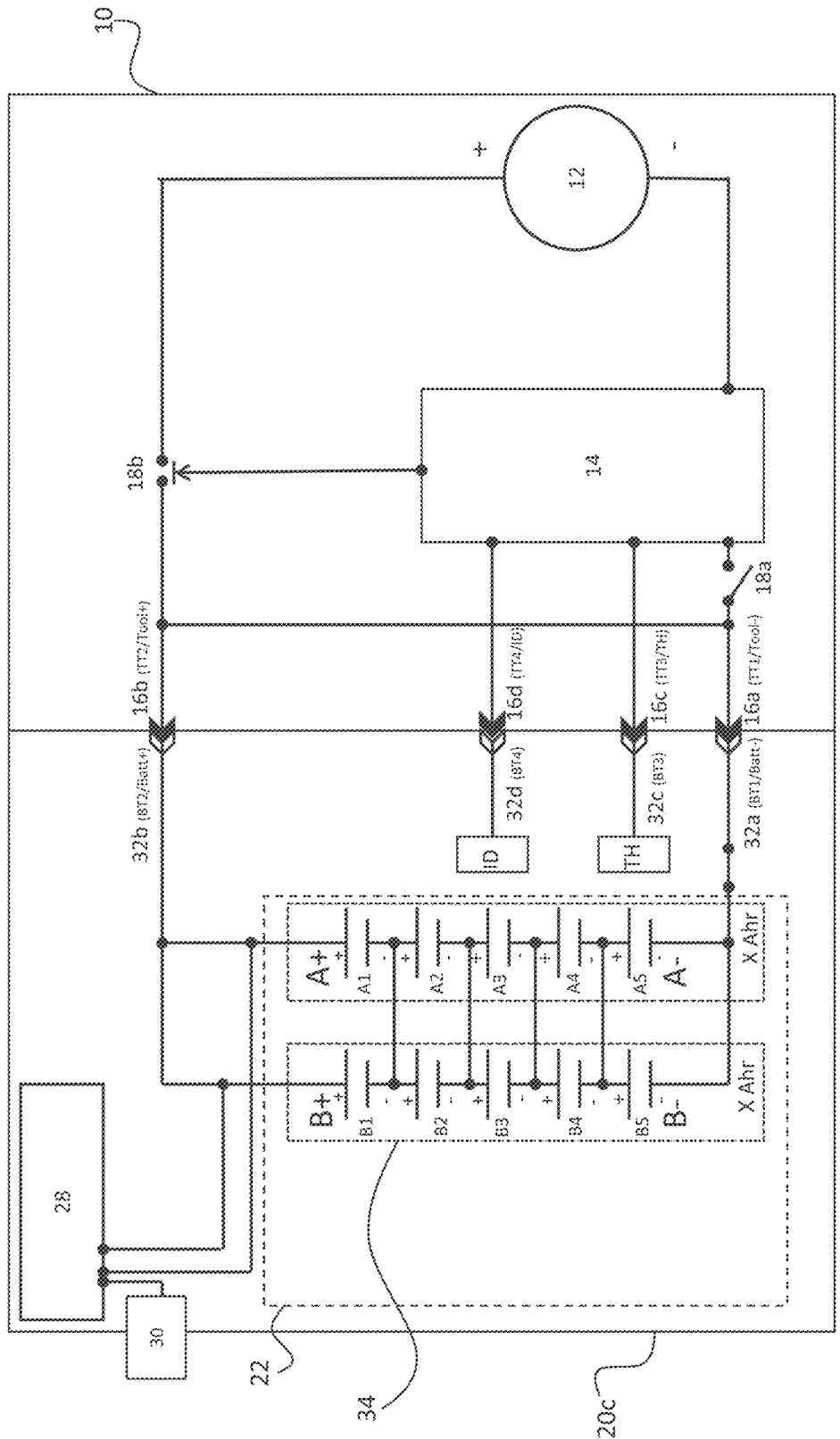
FIG. 3 is a schematic diagram of a third example embodiment of a power tool and battery pack.

FIG. 3 illustrates another example embodiment of a combination of a power tool 10 and a battery pack 20c. The power tool 10 of FIG. 3 is the same or similar power tool 10 of FIG. 1. The battery pack 20c is similar to the battery pack 20b of FIG. 2 except in the particular example embodiment illustrated in FIG. 3, there are intra-cell node connections between corresponding nodes of strings of battery cells.

With regard to each string 34 of the battery pack 20c, there is a node between adjacent battery cells A or B between the positive terminal of one cell and the negative terminal of an adjacent cell. For example, there is an intra-cell node between the positive terminal of the A5 battery cell and the negative terminal of the A4 battery cell of the A string 34 of battery cells. There are similar nodes between the A4 and A3 battery cells, the A3 and A2 battery cells and the A2 and A1 battery cells. There are also similar intra-cell node between B5 and B4 battery cells, the B4 and B3 battery cells, the B3 and B3 battery cells and the B2 and B1 battery cells of the B string 34 of battery cells. In the example battery pack 20c, the intra-cell node between the A5 and A4 battery cells is coupled to the intra-cell node between the B5 and B4 battery cells. There are similar connections between the other intra-cell nodes of the A string 34 and the B string 34.

In this example embodiment, each individual battery cell A has a nominal voltage of approximately about 3.6 v to about 3.7 v. Furthermore, each individual battery cell A has an impedance of approximately about 13 mΩ to approximately about 20 mΩ. Furthermore, each individual battery cell A has a capacity of approximately about 1 AHr. to approximately about 6 AHr.

Figure 4:
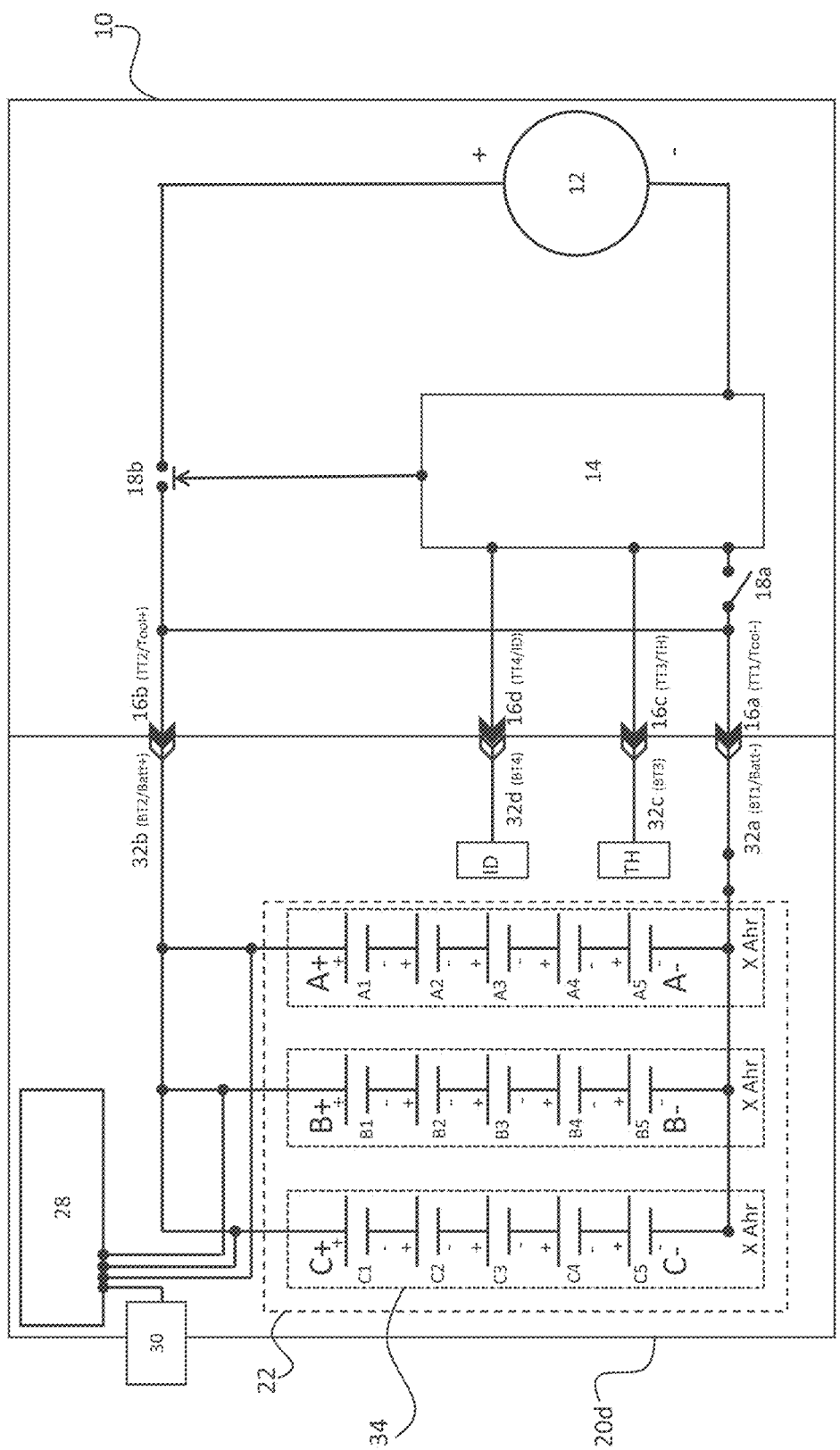
FIG. 4 is a schematic diagram of a fourth example embodiment of a power tool and battery pack.

FIG. 4. illustrates another example embodiment of a combination of a power tool 10 and a battery pack 20d. The power tool 10 of FIG. 3 is the same or similar power tool 10 of FIG. 1. The battery pack 20d is similar to the battery pack 20b of FIG. 2 except in the particular example embodiment illustrated in FIG. 4, there is a third plurality (e.g., five) of individual battery cells–C1, C2, C3, C4, C5. Each individual battery cell C includes a positive terminal (+) and negative terminal (−). In this particular example embodiment, the plurality of individual battery cells C1-C5 are electrically connected in series in a second (C) string 34 of battery cells C1-C5. The C string 34 of battery cells C1-C5 includes a negative string terminal C− and a positive string terminal C+. The negative string terminal C− is coupled to the negative string terminal B−, the negative string terminal A− and the pack negative power terminal 32a and the positive string terminal C+ is coupled to the positive string terminal B+, the positive string terminal A+ and the pack positive power terminal 32b. As such, the A string 34, the B string 34, and the C string 34 are electrically coupled in parallel. The battery pack control module 28 is also coupled to the C string 34 to receive information regarding the status and health of the C string 34 and the individual battery cells C1-C5 of the C string 34. As such, the set 22 of battery cells includes three strings 34 of battery cells.

In this example embodiment, each individual battery cell A has a nominal voltage of approximately about 3.6 v to about 3.7 v. Furthermore, each individual battery cell A has an impedance of approximately about 13 mΩ to approximately about 20 mΩ. Furthermore, each individual battery cell A has a capacity of approximately about 1 AHr. to approximately about 6 AHr.

Figure 5:
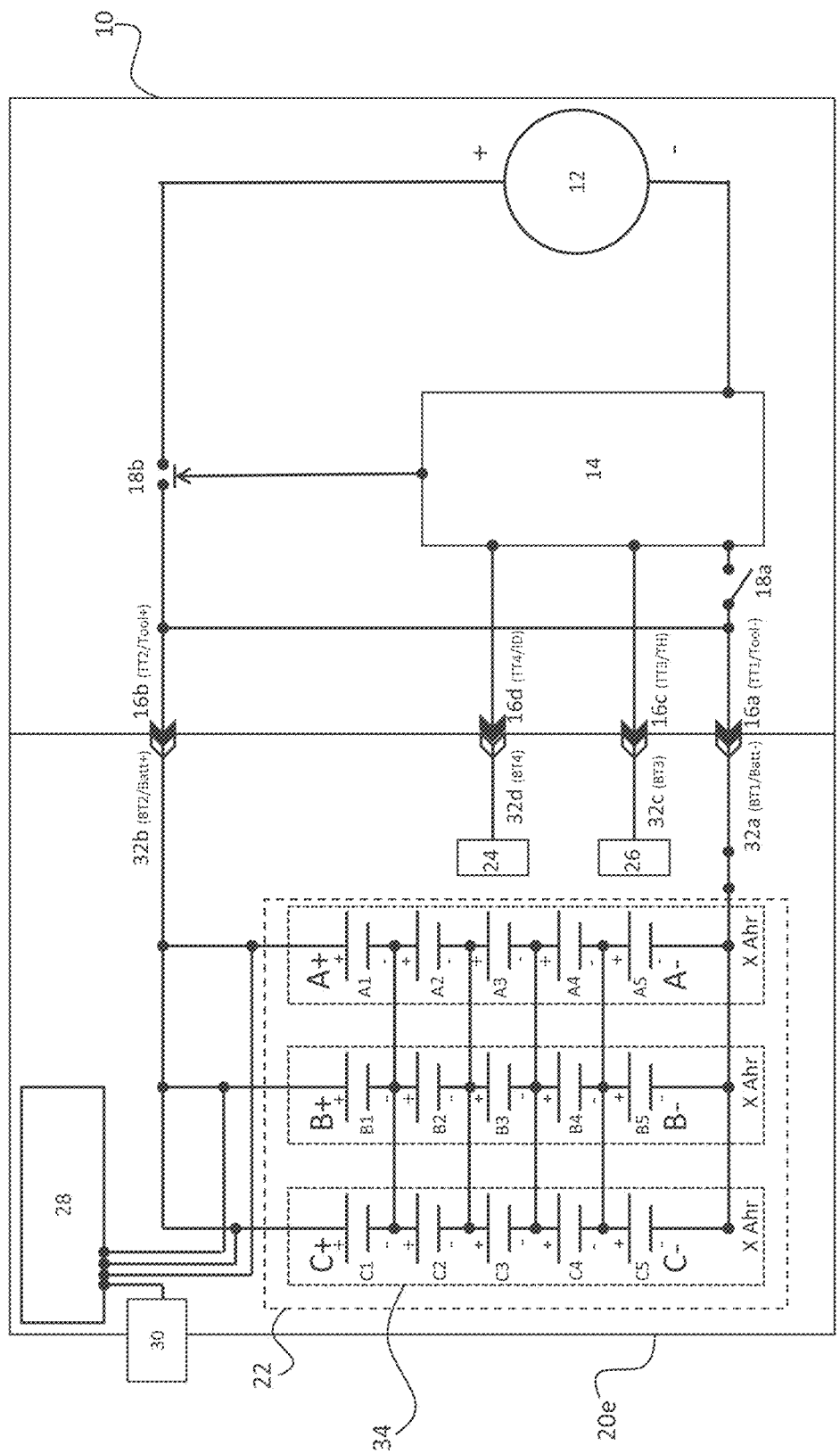
FIG. 5 is a schematic diagram of a fifth example embodiment of a power tool and battery pack.

FIG. 5 illustrates another example embodiment of a combination of a power tool 10 and a battery pack 20e. The power tool 10 of FIG. 5 is the same or similar power tool 10 of FIG. 1. The battery pack 20e is similar to the battery pack 20c of FIG. 3 except in the particular example embodiment illustrated in FIG. 3, there is a third string of battery cells and there are intra-cell node connections between corresponding nodes of all three strings of battery cells similar to the connections in FIG. 3.

In this example embodiment, each individual battery cell A has a nominal voltage of approximately about 3.6 v to about 3.7 v. Furthermore, each individual battery cell A has an impedance of approximately about 13 mΩ to approximately about 20 mΩ. Furthermore, each individual battery cell A has a capacity of approximately about 1 AHr. to approximately about 6 AHr.

Figure 6:
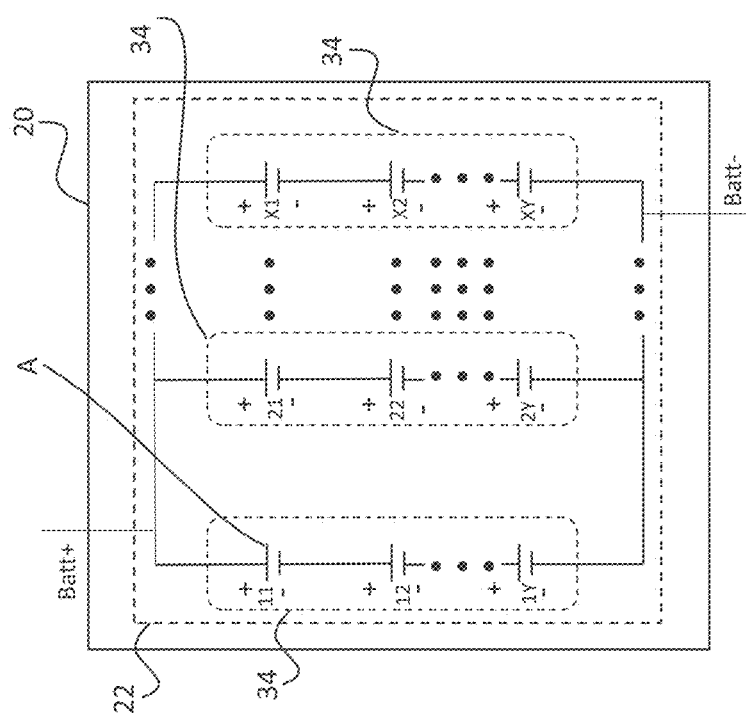
FIG. 6 is a schematic diagram of a first example embodiment of a generic battery pack.
Figure 7:
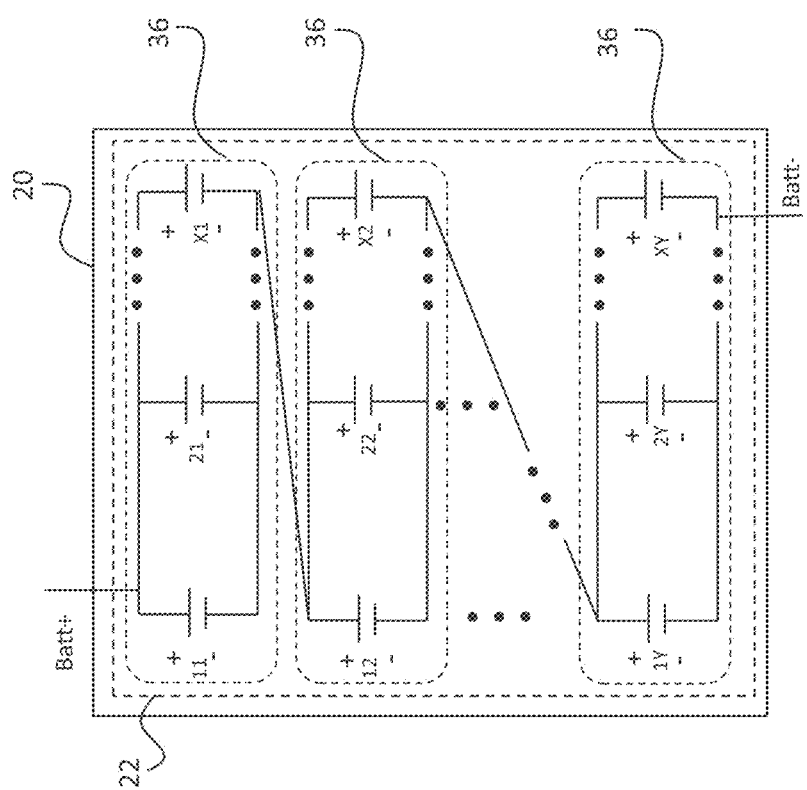
FIG. 7 is a schematic diagram of a second example embodiment of a generic battery pack.

FIG. 6 schematically illustrates an example battery pack having one or more strings (X) of cells (Y) where X is greater than or equal to 1 and Y is greater than or equal to 1. The cells within the strings are connected to each other in series and the strings are connected to each other in parallel. FIG. 7 schematically illustrates another example battery pack having one or more strings (X) of cells (Y) where X is greater than or equal to 1 and Y is greater than or equal to 1. The cells within the within the strings are connected to each other in series and the strings are connected to each other in parallel. The example battery pack of FIG. 7 differs from the example battery pack of FIG. 6 in that in the example battery pack of FIG. 7 a node between adjacent cells in a first string is electrically connected to a corresponding node between adjacent cells of a second string. In other words, in considering FIG. 7, there is an electrical connection between the node between cell 11 and cell 12 and the node between cell 21 and cell 22 and the node between cell X1 and X2. An alternate but equivalent way to consider the manner in which the cells are electrically connected is that blocks 36 of cells in which the cells are electrically connected with each other in parallel and the blocks 36 are electrically connected with each other in series.

With regard to FIGS. 6 and 7, each individual battery cell A has a nominal voltage of approximately about 3.6 v to about 3.7 v. Furthermore, each individual battery cell A has an impedance of approximately about 13 mΩ to approximately about 20 mΩ. Furthermore, each individual battery cell A has a capacity of approximately about 1 AHr. to approximately about 6 AHr.

The following provides a few examples of the nominal voltage and capacity of a variety of battery packs: (1) a battery pack having five (5) 2 AHr Li-ion cells connected in series will have a nominal voltage of 18 volts and a capacity of 2 AHr—referred to as a 5S1P battery pack (see the battery pack of FIG. 1); (2) a battery pack having ten (10) 2 AHr Li-ion cells with a first string of five (5) cells connected in series and a second string of five (5) cells connected in series and the first and second strings connected to each other in parallel will have a nominal voltage of 18 volts and a capacity of 4 AHr—referred to as a 5S2P battery pack (see the battery pack of FIGS. 2 and 3); (3) a battery pack having fifteen (15) 2 AHr Li-ion cells with a first string of five (5) cells connected in series and a second string of five (5) cells connected in series and a third string of five (5) cells connected in series and the first and second and third strings connected to each other in parallel will have a nominal voltage of 18 volts and a capacity of 6 AHr—referred to as a 5S3P battery pack (see the battery pack of FIGS. 4 and 5); (4) a battery pack having ten (10) 2 AHr Li-ion cells connected in series will have a nominal voltage of 36 volts and a capacity of 2 AHr—referred to as a 10S1P battery pack (see the battery pack of FIGS. 6 and 7 where X=1 and Y=10); (5) a battery pack having twenty (20) 2 AHr Li-ion cells with a first string of ten (10) cells connected in series and a second string of ten (10) cells connected in series and the first and second strings connected to each other in parallel will have a nominal voltage of 36 volts and a capacity of 4 AHr—referred to as a 10S2P battery pack (see the battery pack of FIGS. 6 and 7 where X=2 and Y=10); (6) a battery pack having thirty (30) 2 AHr Li-ion cells with a first string of ten (10) cells connected in series and a second string of ten (10) cells connected in series and a third string of ten (10) cells connected in series and the first and second and third strings connected to each other in parallel will have a nominal voltage of 36 volts and a capacity of 6 AHr—referred to as a 10S3P battery pack (see the battery pack of FIGS. 6 and 7 where X=3 and Y=10); (7) a battery pack having fifteen (15) 2 AHr Li-ion cells connected in series will have a nominal voltage of 54 volts and a capacity of 2 AHr—referred to as a 15S1P battery pack (see the battery pack of FIGS. 6 and 7 where X=1 and Y=15); (8) a battery pack having thirty (30) 2 AHr Li-ion cells with a first string of fifteen (15) cells connected in series and a second string of fifteen (15) cells connected in series and the first and second strings connected to each other in parallel will have a nominal voltage of 54 volts and a capacity of 4 AHr—referred to as a 15S2P battery pack (see the battery pack of FIGS. 6 and 7 where X=2 and Y=15); (9) a battery pack having forty five (45) 2 AHr Li-ion cells with a first string of fifteen (15) cells connected in series and a second string of fifteen (15) cells connected in series and a third string of fifteen (15) cells connected in series and the first and second and third strings connected to each other in parallel will have a nominal voltage of 54 volts and a capacity of 6 AHr—referred to as a 15S3P battery pack (see the battery pack of FIGS. 6 and 7 where X=3 and Y=15); (10) a battery pack having twenty (20) 2 AHr Li-ion cells connected in series will have a nominal voltage of 72 volts and a capacity of 2 AHr—referred to as a 20S1P battery pack (see the battery pack of FIGS. 6 and 7 where X=1 and Y=20); (11) a battery pack having forty (40) 2 AHr Li-ion cells with a first string of twenty (20) cells connected in series and a second string of twenty (20) cells connected in series and the first and second strings connected to each other in parallel will have a nominal voltage of 72 volts and a capacity of 4 AHr—referred to as a 20S2P battery pack (see the battery pack of FIGS. 6 and 7 where X=2 and Y=20); (12) a battery pack having sixty (60) 2 AHr Li-ion cells with a first string of twenty (20) cells connected in series and a second string of twenty (20) cells connected in series and a third string of twenty (20) cells connected in series and the first and second and third strings connected to each other in parallel will have a nominal voltage of 72 volts and a capacity of 6 Ahr—referred to as a 20S3P battery pack (see the battery pack of FIGS. 6 and 7 where X=3 and Y=20); (13) a battery pack having thirty (30) 2 AHr Li-ion cells connected in series will have a nominal voltage of 108 volts and a capacity of 2 AHr—referred to as a 30S1P battery pack (see the battery pack of FIGS. 6 and 7 where X=1 and Y=30); (14) a battery pack having sixty (60) 2 AHr Li-ion cells with a first string of thirty (30) cells connected in series and a second string of thirty (30) cells connected in series and the first and second strings connected to each other in parallel will have a nominal voltage of 108 volts and a capacity of 4 AHr—referred to as a 30S2P battery pack (see the battery pack of FIGS. 6 and 7 where X=2 and Y=30); (15) a battery pack having ninety (90) 2 AHr Li-ion cells with a first string of thirty (30) cells connected in series and a second string of thirty (30) cells connected in series and a third string of thirty (30) cells connected in series and the first and second and third strings connected to each other in parallel will have a nominal voltage of 108 volts and a capacity of 6 AHr—referred to as a 30S3P battery pack (see the battery pack of FIGS. 6 and 7 where X=3 and Y=30).

The power tools and battery packs may have ratings for features other than voltage. For example, the power tools may have ratings for motor performance, such as an output power (e.g., maximum watts out (MWO) as described in U.S. Pat. No. 7,497,275, which is incorporated by reference) or motor speed under a given load condition.

This application may also refer to the ratings for voltage (and other features) using relative terms such as low, medium, high, and very high. The terms low rated, medium rated, high rated, and very high rated are relative terms used to indicate relative relationships between the various ratings of the power tools and battery packs, and components thereof, and are not intended to be limited to any particular numerical values or ranges. For example, it should be understood that a low rated voltage is generally lower than a medium rated voltage, a medium rated voltage is generally lower than a high rated voltage, and a high rated voltage is generally lower than a very high rated voltage. In one particular implementation, the different rated voltages may be whole number multiples or factors of each other. For example, the medium rated voltage may be a whole number multiple of the low rated voltage, and the high rated voltage may be a whole number multiple of the medium rated voltage. For example, the low rated voltage may be 20V, the medium rated voltage may be 60V, and the high rated voltage may be 120V.

In some instances, a power tool or a battery pack may be said to have multiple rated voltages. For example, a power tool or a battery pack may have a low/medium rated voltage or a medium/high rated voltage. As discussed in more detail below, this multiple rating refers to the power tool or a battery pack having more than one nominal voltage, more than one advertised voltage, or being configured to operate with two or more power tools or battery packs, having different rated voltages from each other. For example, a medium/high rated voltage battery pack may be labeled with a medium and a high voltage and may be configured to operate with a medium rated voltage power tool or a high rated voltage power tool. It should be understood that a multiple rated voltage may mean that the rated voltage comprises a range that spans two different rated voltages or that the rated voltage has two discrete different rated values.

This application also may refer to a first power tool or battery pack, or component thereof as having a first rated voltage that corresponds to, matches, or is equivalent to a second rated voltage of a second power tool or battery pack, or component thereof. This comparison generally refers to the first rated voltage having a description that is substantially equivalent to a description of the second rated voltage, or that the first power tool or battery pack, or component thereof, is configured to operate with the second power tool or battery pack, or component thereof. For example, a power tool having a rated voltage of 120V may operate with one or more battery packs having a total rated voltage of 120V Conversely, this application also may refer to a first power tool or battery pack, or component thereof as having a first rated voltage that does not correspond to, that is different from, or that is not equivalent to a second rated voltage of a second power tool or battery pack, or component thereof. These comparisons generally refer to the first rated voltage having a description that is not equivalent to a description of the second rated voltage, or that the first power tool or battery pack, or component thereof is not configured to operate with the second power tool or battery pack, or component thereof. For example, a power tool having the rated voltage of 120V may not operate with one or more battery packs having a total rated voltage of 60V. Alternatively, some power tools include a tool control module that recognizes that the attached battery pack does not have an equivalent rated voltage and is able to adjust the input voltage to supply an appropriate output voltage to the motor to enable the power tool and the battery pack(s) to operate together. For example, if a battery pack (or battery packs) having a rated voltage of 60V is coupled to a power tool having a rated voltage of 120V, the power tool control module may adjust the voltage supplied from the battery pack to properly operate with the power tool motor or may adjust the operation of the power tool motor in light of the voltage supplied from the battery pack. In another example, if a battery pack (or battery packs) having a rated voltage of 120V is coupled to a power tool having a rated voltage of 60V, the power tool control module may adjust the voltage supplied from battery pack to properly operate with the power tool motor or may adjust the operation of the power tool motor in light of the voltage supplied from the battery pack. In one example, these features may be implemented through a buck or a boost circuit.

Referring to FIG. 8, in one example embodiment, a power tool system 100 includes a set of cordless power tools 110 and a set of battery packs 112. Each of the cordless power tools of the set of cordless power tools may be powered by one of the battery packs of the set of battery packs 112. The set of power tools 110 may include, for example, a concrete saw 116, a circular saw 118, a chop saw 120, a chain saw 122, and a grinder 124. It is understood that the power tools 116-124 illustrated in FIG. 1 are examples and that other power tools are contemplated to be included as part of the power tool system 100, even though not illustrated. The set of power tools 110 may include a subset of medium voltage rated power tools (60V) 110a (also referred to simply as medium voltage power tools) and a subset of high voltage rated power tools (120V) 110b (also referred to simply as high voltage power tools). In other words, the concrete saw 116 may be a medium voltage concrete saw 116a and/or a high voltage concrete saw 116b and the circular saw 118 may be a medium voltage circular saw 118a and/or a high voltage circular saw 118b and the chop saw 120 may be a medium voltage chop saw 120a and/or a high voltage chop saw 120b and the chain saw 122 may be a medium voltage chain saw 122a and/or a high power chain saw 122b and the grinder 124 may be a medium voltage grinder 124a and/or a high voltage grinder 124b.

Each power tool 116-124 includes a battery pack interface. The battery pack interface is configured with one receptacle for receiving one removable, rechargeable battery pack (a single receptacle).

The set of battery packs 112 may include a subset of multi-voltage capable battery packs 112a and a set of single voltage capable battery packs 112b. The battery packs of the set of battery packs 112 may include Li-ion battery cells having a nominal voltage of approximately about 3.6 volts, an impedance ranging from approximately about 13 mΩ to approximately about 20 mΩ, and a capacity of approximately about 1 AHr to approximately about 6 AHr, as described above.

The battery packs of the subset of multi-voltage capable battery packs 112a may provide a first output voltage and a second output voltage, depending upon the power tool to which it is coupled. For example, the subset of multi-voltage capable battery packs 112a may include a subset of low voltage/medium voltage capable battery packs 112a1 and a subset of medium voltage/high voltage capable battery packs 112a2. In an example embodiment, the low voltage is a 20V rated voltage and the medium voltage is a 60V rated voltage and the high voltage is a 120V rated voltage. In this example embodiment, the set of low voltage/medium voltage battery packs 112a1 may include 5S3P/15S1P battery packs, 5S6P/15S2P battery packs, and 5S9P/15S3P battery packs and the set of medium voltage/high voltage battery packs 112a2 may include 15S2P/30S1P battery packs, 15S4P/30S2P battery packs and 15S6P/30S3P battery packs. For example, the battery packs of the subset of low voltage/medium voltage battery packs 112a1 may have a rated voltage of 20V or 60V depending on the power tool to which it is coupled and the battery packs of the subset of medium voltage/high voltage battery packs 112a2 may have a rated voltage of 60V or 120V depending on the power tool to which it is coupled. In this example embodiment, the low voltage/medium voltage battery packs 112a1 are defaulted to the low voltage mode. In other words, when not coupled to a power tool 110, the low voltage/medium voltage battery packs 112a1 are in a low voltage mode. Also, in this example embodiment, the medium voltage/high voltage battery packs 112a2 are defaulted to the high voltage mode. In other words, when not coupled to a power tool 110, the medium voltage/high voltage battery packs 112a2 are in a high voltage mode. This will be described in more detail below. Examples of these battery packs can be found in U.S. Pat. No. 9,406,915, which is incorporated by reference.

The battery packs of the subset of single voltage capable battery packs 112b may provide a single output voltage regardless of the power tool to which it is coupled. For example, the subset of single voltage capable battery packs 112b may include a subset of medium voltage capable battery packs 112b1 and a subset of high voltage capable battery packs 112b2. In this example embodiment, the medium voltage is a 60V rated voltage and the high voltage is a 120V rated voltage. In this example embodiment, the set of medium voltage battery packs 112b1 may be include 15S1P battery packs, 15S2P battery packs, and 15S3P battery packs and the set of high voltage battery packs 112b2 may include 30S1P battery packs, 30S2P battery packs and 30S3P battery packs.

In various combinations, one of the battery packs of the set of battery packs 112 may be coupled and operated with the power tools of the set of power tools 110. For example, a medium voltage (60V) power tool 110a may be combined with (a) one multi-voltage battery pack 112a2 in medium voltage (60V) mode or (b) one single-medium-voltage (60V) battery pack 112*b*1. In another example, a high voltage (120V) power tool 110*b* may be combined with (a) one multi-voltage battery pack 112*a*2 in high voltage (120V) mode or (b) one single-high-voltage (120V) battery pack 112*b*2. FIGS. 9A-9D illustrate various example combinations of the set of power tools 110 and the set of battery packs 112. FIGS. 9A-9D illustrate a power tool from the set of power tools 110 having a tool control module 14 and a motor (M) 12 and a battery pack from the set of battery packs 112 having a set 22 of battery cells. FIG. 9A illustrates a combination of one of the power tools from the set of medium voltage (60V) power tools 110*a* and one of the battery packs from the set of multi-voltage (20V/60V or 60V/120V) battery packs 112*a* or the set of medium voltage (60V) battery packs 112*b*1. In this combination, the medium voltage (60V) power tools 110*a* are configured to configure the multi-voltage capable battery packs 112*a* in the medium voltage (60V) configuration.

Figure 9B:
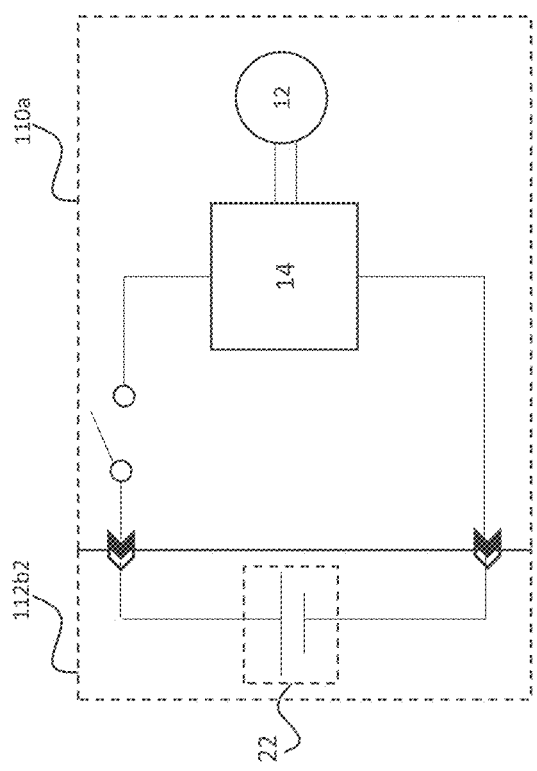
FIGS. 9A, 9B, 9C, and 9D are schematic diagrams of various combinations of the power tools and the battery packs of the example power tool system of FIG. 8.
Figure 9A:
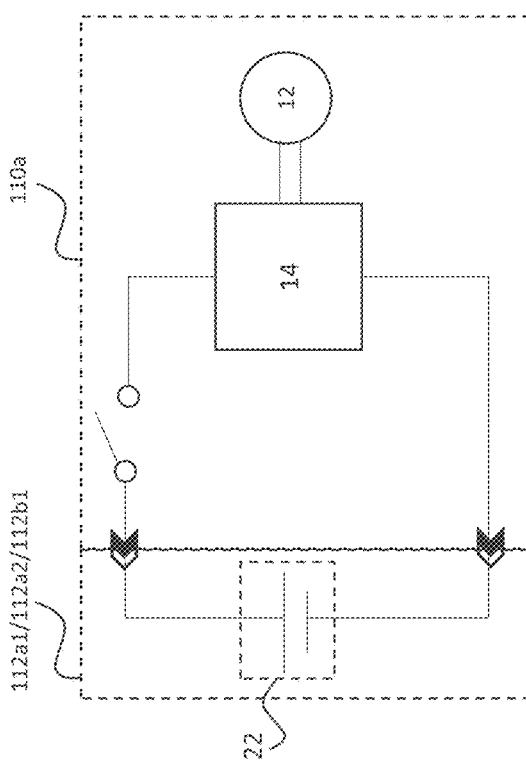

FIG. 9B illustrates a combination of one of the power tools from the set of medium voltage (60V) power tools 110*a* and one of the battery packs from the set of high voltage (120V) battery packs 112*b*2. In this combination, a tool control module 14 of the medium voltage (60) power tools 110*a* recognizes the high voltage (120V) output from the high voltage (120V) battery packs 112*b*2/input to the medium voltage (60V) power tools 110*a* and adjusts the voltage input to the motor (M) 12.

Figure 9D:
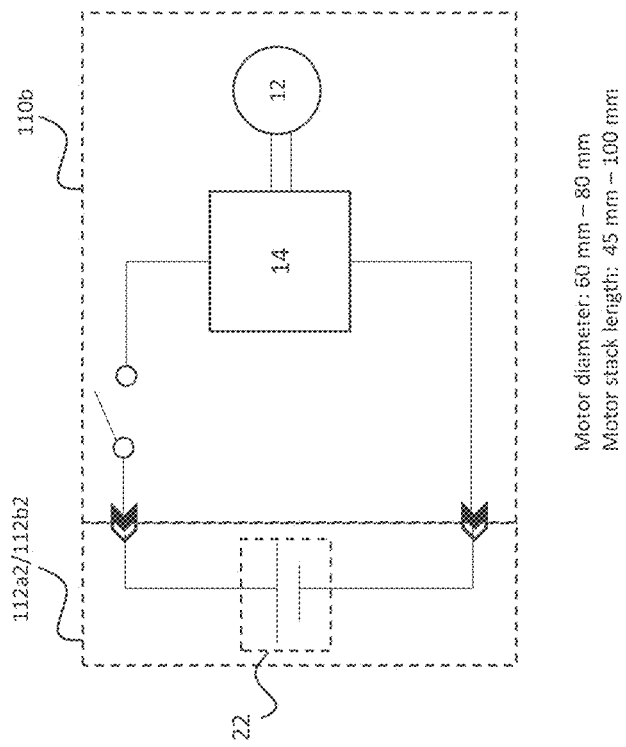
Figure 9C:
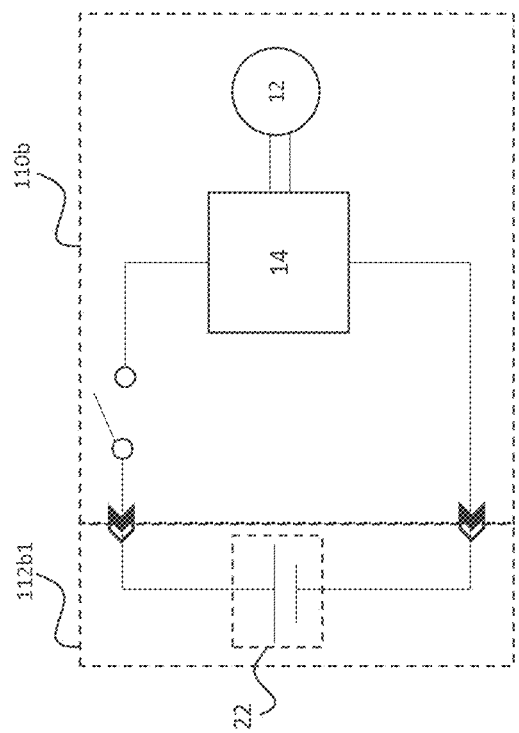

FIG. 9C illustrates a combination of one of the power tools from the set of high voltage (120V) power tools 110*b* and one of the battery packs from the set of medium voltage (60V) battery packs 112*b*1. In this combination, the tool control module 14 of the high voltage power tools 110*b* recognizes the medium voltage (60V) output from the medium voltage (60V) battery packs 112*b*1/input to the high voltage (120V) power tools 110*b* and adjusts the voltage input to the motor (M) 12.

FIG. 9D illustrates a combination of one of the power tools from the set of high voltage (120V) power tools 110*b* and one of the battery packs from the set of medium voltage/high voltage (60V/120V) battery packs 112*a*2 or the set of high voltage (120V) battery packs 112*b*2. In this combination, the high voltage (120V) power tools 110*b* are configured to configure the medium voltage/high voltage (60V/120V) battery packs 112*a*2 in the high voltage (120V) configuration.

Each of the battery packs of the set of battery packs 112 may include different battery characteristics. The battery packs 112 may be implemented in different configurations having varying numbers, arrangements, and types of battery cells that are capable of having different operating characteristics in terms of nominal or operating voltages for the battery cells, impedance values for the battery cells, as well as different amp-hours (Ah) and watt-hours (Wh), as discussed in more detail below.

Figure 10:
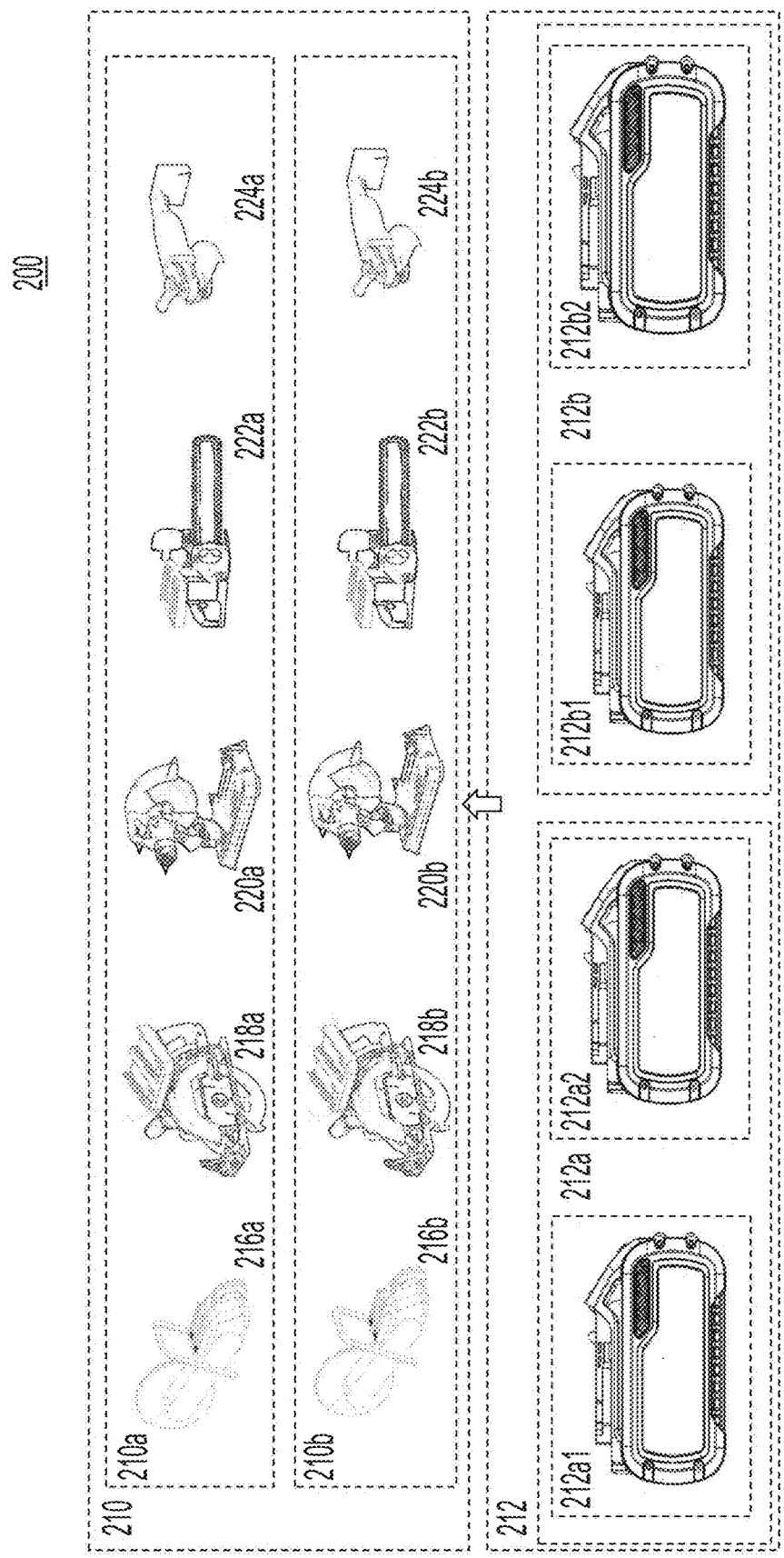
FIG. 10 illustrates a second example embodiment of a power tool system.

Referring to FIG. 10, in one example embodiment, a power tool system 200 includes a set of cordless power tools 210 and a set of battery packs 212. Each of the power tools of the set of power tools 210 may be powered by two of the battery packs of the set of battery packs 212. The set of power tools 210 may include, for example, a concrete saw 216, a circular saw 218, a chop saw 220, a chain saw 222, and a grinder 224. The set of power tools 210 may include a subset of medium voltage rated power tools (60V) 210*a* (also referred to simply as medium voltage power tools) and a subset of high voltage rated power tools (120V) 210*b* (also referred to simply as high voltage power tools). In other words, the concrete saw 216 may be a medium voltage concrete saw 216*a* and/or a high voltage concrete saw 216*b* and the circular saw 218 may be a medium voltage circular saw 218*a* and/or a high voltage circular saw 218*b* and the chop saw 220 may be a medium voltage chop saw 220*a* and/or a high voltage chop saw 220*b* and the chain saw 222 may be a medium voltage chain saw 222*a* and/or a high power chain saw 222*b* and the grinder 224 may be a medium voltage grinder 224*a* and/or a high voltage grinder 224*b*.

The set of power tools 200 includes a battery pack interface. The battery pack interface is configured with two receptacles, each receptacle for receiving one removable, rechargeable battery pack (a double receptacle). It is understood that the power tools 216-224 illustrated in FIG. 10 are examples and that other power tools are contemplated to be included as part of the power tool system 200, even though not illustrated.

In the example power tool system 200, different types of battery packs may be used with each of the power tools 216-224. The set of battery packs 212 may include a subset of multi-voltage capable battery packs 212*a* and a set of single voltage capable battery packs 212*b*. The battery packs of the set of battery packs 212 may include Li-ion battery cells having a nominal voltage of approximately about 3.6 volts, an impedance ranging from approximately about 13 mΩ to approximately about 20 mΩ, and a capacity of approximately about 1 AHr to approximately about 6 AHr, as described above.

The battery packs of the subset of multi-voltage capable battery packs 212*a* may provide a first output voltage and a second output voltage, depending upon the power tool to which it is coupled. For example, the subset of multi-voltage capable battery packs 212*a* may include a subset of low voltage/medium voltage capable battery packs 212*a*1 and a subset of medium voltage/high voltage capable battery packs 212*a*2. In an example embodiment, the low voltage is a 20V rated voltage and the medium voltage is a 60V rated voltage and the high voltage is a 120V rated voltage. In this example embodiment, the set of low voltage/medium voltage battery packs 212*a*1 may include 5S3P/15S1P battery packs, 5S6P/15S2P battery packs, and 5S9P/15S3P battery packs and the set of medium voltage/high voltage battery packs 212*a*2 may include 15S2P/30S1P battery packs, 15S4P/30S2P battery packs and 15S6P/30S3P battery packs. For example, the battery packs of the subset of low voltage/medium voltage battery packs 212*a*1 may have a rated voltage of 20V or 60V depending on the power tool to which it is coupled and the battery packs of the subset of medium voltage/high voltage battery packs 212*a*2 may have a rated voltage of 60V or 120V depending on the power to which it is coupled. In this example embodiment, the low voltage/medium voltage battery packs 212*a*1 are defaulted to the low voltage mode. In other words, when not coupled to a power tool 210, the low voltage/medium voltage battery packs 212*a*1 are in a low voltage mode. Also, in this example embodiment, the medium voltage/high voltage battery packs 212*a*2 are defaulted to the high voltage mode. In other words, when not coupled to a power tool 210, the medium voltage/high voltage battery packs 212*a*2 are in a high voltage mode. This will be described in more detail below. Examples of these battery packs can be found in U.S. Pat. No. 9,406,915, which is incorporated by reference.

The battery packs of the subset of single voltage capable battery packs 212*b* may provide a single output voltage regardless of the power tool to which it is coupled. For example, the subset of single voltage capable battery packs 212*b* may include a subset of medium voltage capable battery packs 212*b*1 and a subset of high voltage capable battery packs 212*b*2. In this example embodiment, the medium voltage is a 60V rated voltage and the high voltage is a 120V rated voltage. In this example embodiment, the set of medium voltage battery packs 212*b*1 may include 15S1P battery packs, 15S2P battery packs, and 15S3P battery packs and the set of high voltage battery packs 212*b*2 may include 30S1P battery packs, 30S2P battery packs and 30S3P battery packs.

For example, a medium voltage (60V) power tool 210*a* may be combined with (a) two multi-voltage (20V/60V) battery packs 212*a*1 in medium voltage (60V) mode connected in parallel, e.g., by the tool, (b) two single-medium-voltage (60V) battery packs 212*b*1 connected in parallel, e.g., by the tool or (c) one multi-voltage (60V/120V) battery pack 212*a*2 in medium (60V) mode, e.g., in pack. In another example, a high voltage (120V) power tool 110*b* may be combined with (a) two multi-voltage (20V/60V) battery packs 212*a*1 in medium voltage (60V) mode connected in series, e.g., by the tool, (b) two multi-voltage (60V/120V) 212*a*2 in medium voltage (60V) mode connected in series, e.g., by the tool or (c) one single high voltage (120V) battery pack 212*b*2.

In various combinations, two of the battery packs of the set of battery packs 212 may be coupled and operated with the power tools of the set of power tools 210. FIGS. 11A-11H illustrate various example combinations of the set of power tools 210 and the set of battery packs 212. FIGS. 11A-11H illustrate a power tool from the set of power tools 210 having a tool control module 14 and a motor (M) 12 and two battery packs from the set of battery packs 212 having a set of battery cells. FIG. 11A illustrates a combination of one of the power tools from the set of medium voltage (60V) power tools 210*a* and two of the battery packs from the sets of multi-voltage (20V/60V or 60V/120V) battery packs 212*a* or the set of medium voltage (60V) battery packs 212*b*1. In this combination, the medium voltage (60V) power tools 210*a* are configured to configure the multi-voltage capable battery packs 212*a* in the medium voltage (60V) configuration. In this combination, the medium voltage (60V) power tools 210*a* are configured to connect the two battery packs 212 in parallel.

Figure 11B:
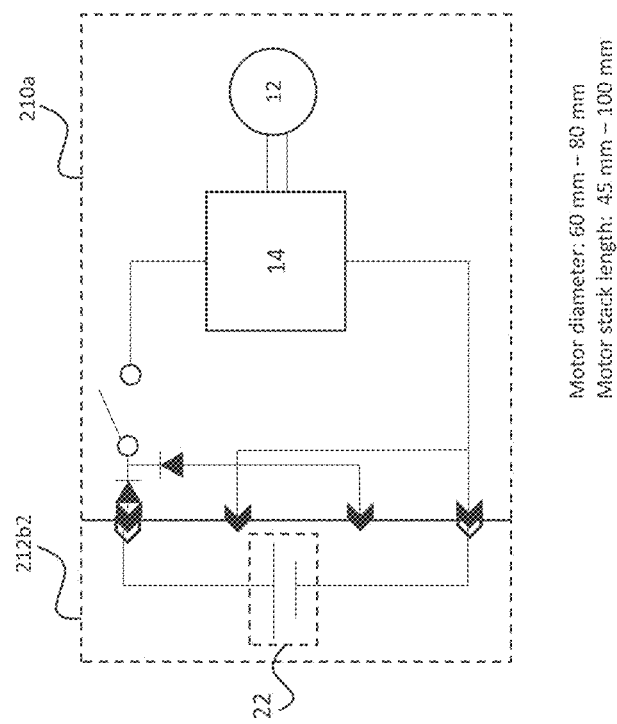
FIGS. 11A-11H are schematic diagrams of various combinations of the power tools and the battery packs of the example power tool system of FIG. 10.
Figure 11A:
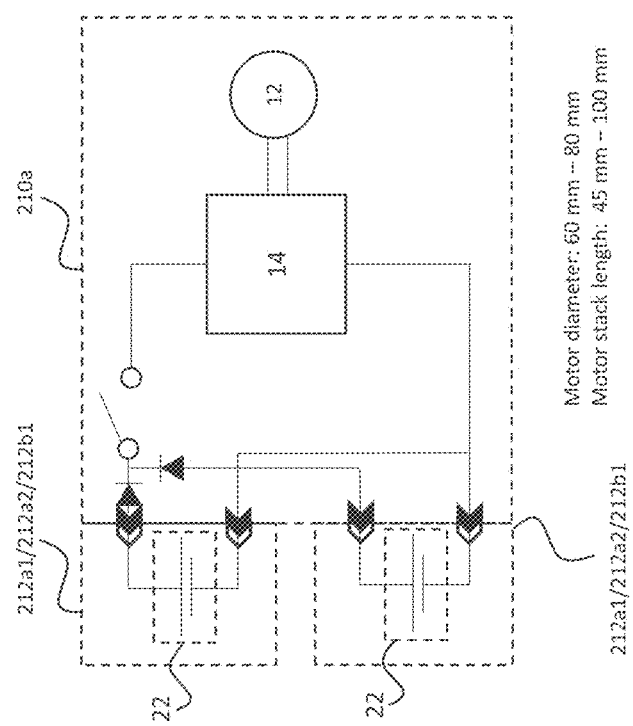

FIG. 11B illustrates a combination of one of the power tools of the set of medium voltage (60V) power tools 210*a* and one of the battery pack of the set of high voltage (120V) battery packs 212*b*2. In this combination, the tool control module 14 of the medium voltage (60V) power tools 210*a* recognizes the high voltage (120V) output from the high voltage (120V) battery packs 212*b*2/input to the medium voltage (60V) power tools 210*a* and adjusts the voltage input to the motor (M) 12.

Figure 11D:
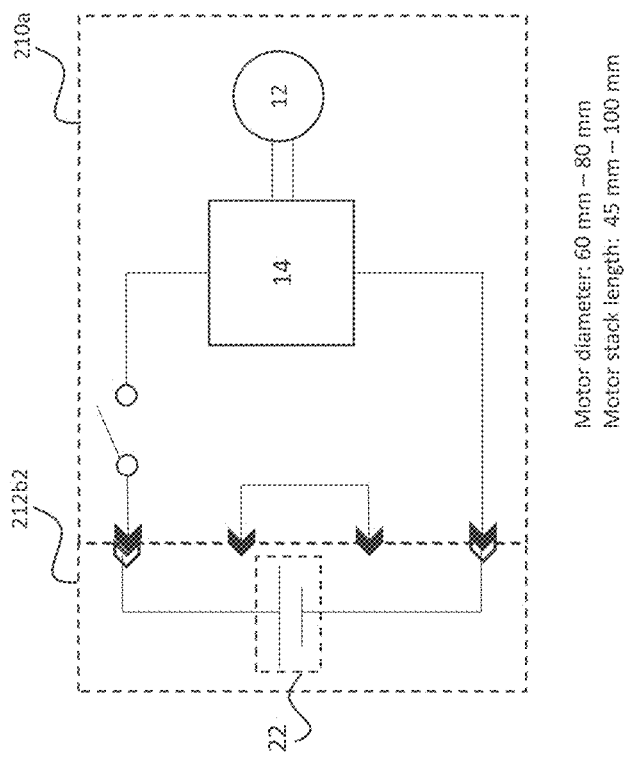
Figure 11C:
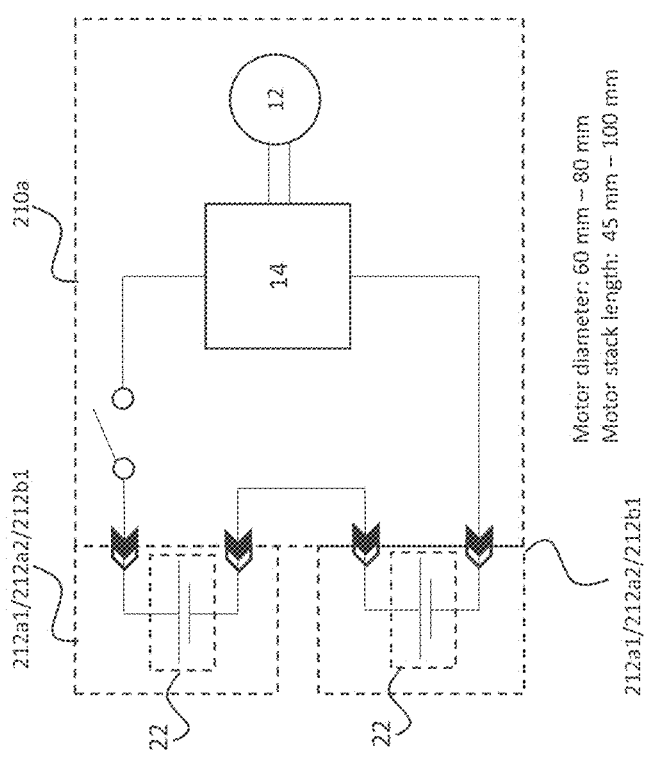

FIG. 11C illustrates a combination of one of the power tools from the set of medium voltage (60V) power tools 210*a* and two of the battery packs from the set of multi-voltage (20V/60V or 60V/120V) battery packs 212*a* or the set of medium voltage (60V) battery packs 212*b*1. In this combination, the medium voltage (60V) power tools 210*a* are configured to configure the multi-voltage capable battery packs 212*a* in the medium voltage (60V) configuration. In this combination, the medium voltage (60V) power tools 210*a* are configured to connect the two battery packs 212 in series. In this combination, the tool control module 14 of the medium voltage (60V) power tools 210*a* recognizes the high voltage (120V) output from the two medium voltage (60V) battery packs 212*a* or 212*b*1 (connected in series)/input to the medium voltage (60V) power tools 210*a* and adjusts the voltage input to the motor (M) 12.

FIG. 11D illustrates a combination of one of the power tools of the set of medium voltage (60V) power tools 210*a* and two of the battery packs of the set of high voltage (120V) battery packs 212*b*2. In this combination, the tool control module 14 of the medium voltage (60V) power tools 210*a* recognizes the high voltage (120V) output from the high voltage (120V) battery packs 212*b*2/input to the medium voltage (60V) power tools 210*a* and adjusts the voltage input to the motor (M) 12.

Figure 11F:
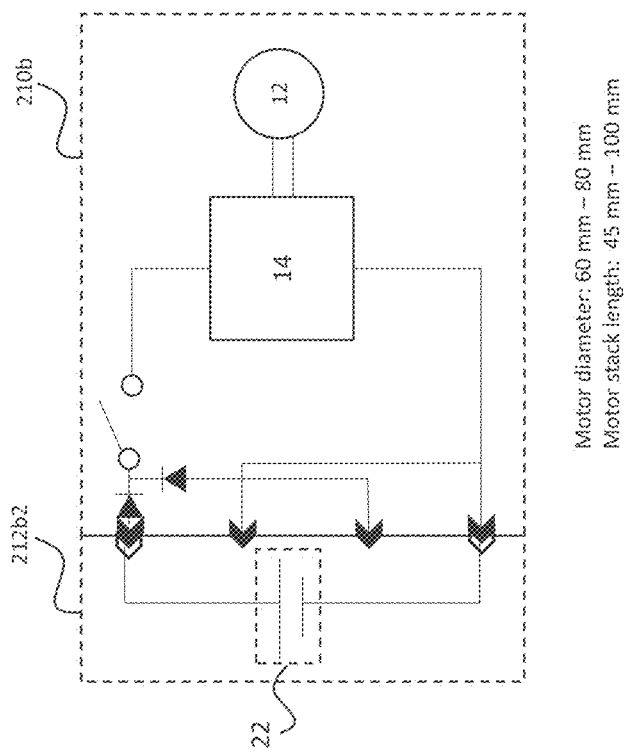
Figure 11E:
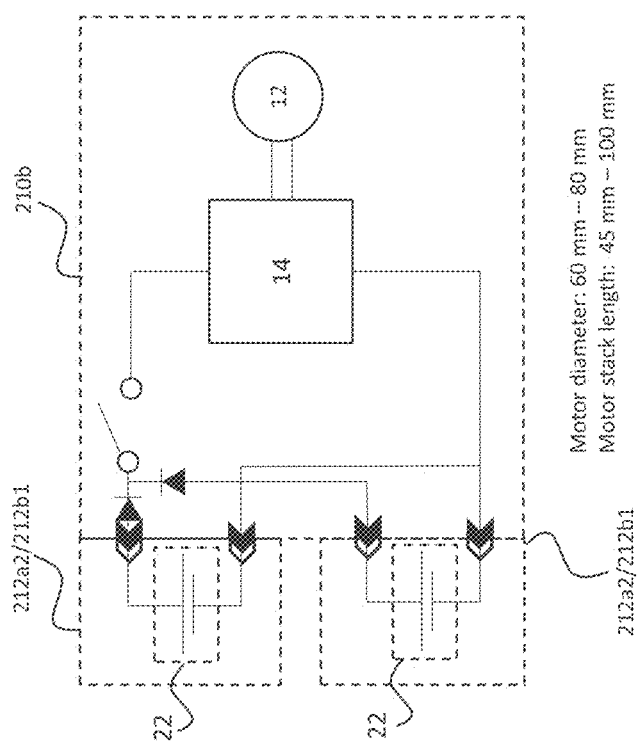

FIG. 11E illustrates a combination of one of the power tools from the set of high voltage (120V) power tools 210*b* and two of the battery packs from the set of medium voltage/high voltage (60V/120V) battery packs 212*a*2 or the set of medium voltage (60V) battery packs 212*b*1. In this combination, the high voltage (120V) power tools 210*b* are configured to configure the medium voltage/high voltage (60V/120V) battery packs 212*a*2 in the high voltage (120V) configuration. In this combination, the high voltage (120V) power tools 210*b* are configured to connect the two battery packs 212 in parallel. In this combination, the tool control module 14 of the high voltage (120V) power tools 210*b* recognizes the medium voltage (60V) output from the medium voltage (60V) battery packs 212*b*1 (connected in parallel)/input to the high voltage (120V) power tools 210*b* and adjusts the voltage input to the motor (M) 12.

FIG. 11F illustrates a combination of one of the power tools from the set of high voltage (120V) power tools 210*b* and one of the battery packs from the set of high voltage (120V) battery packs 212*b*2.

Figure 11H:
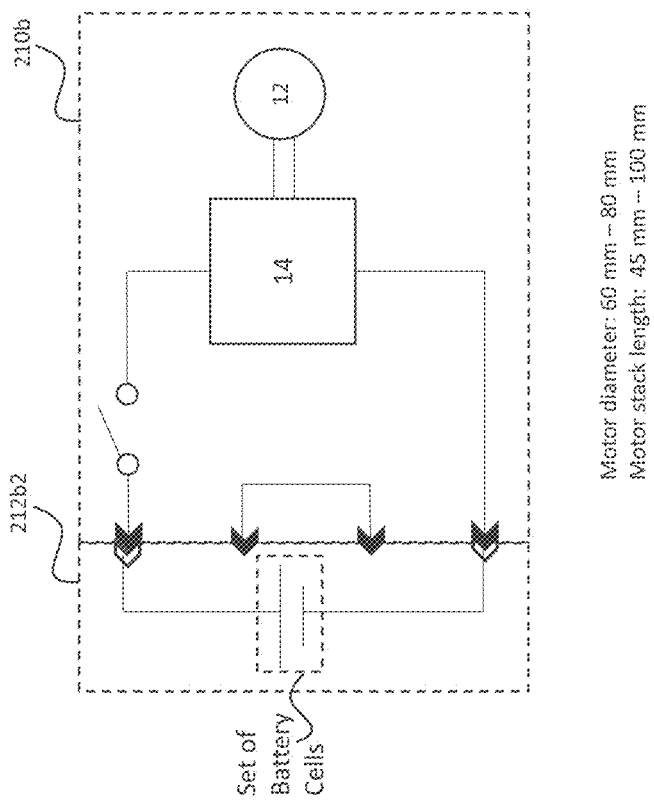
Figure 11G:
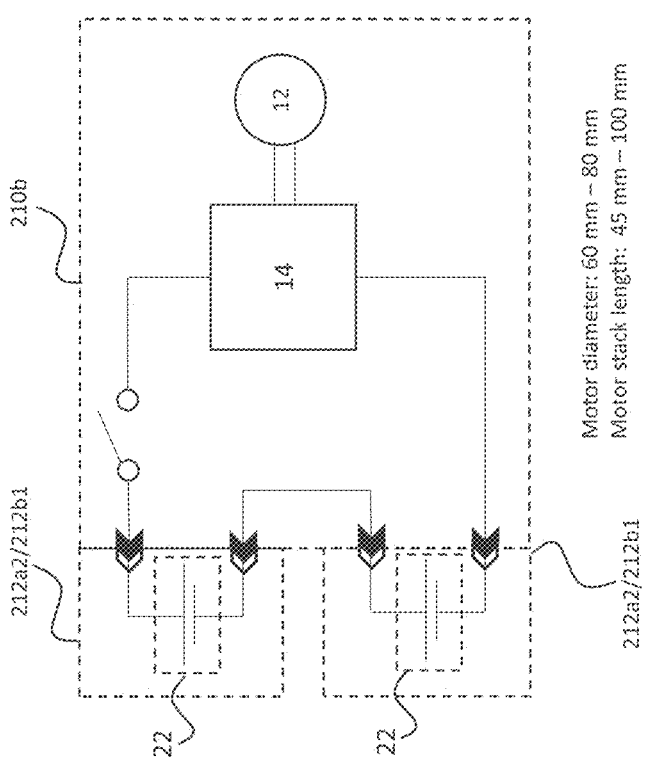

FIG. 11G illustrates a combination of one of the power tools from the set of high voltage (120V) power tools 210*b* and two battery packs from the set of medium voltage/high voltage (60V/120V) battery packs 212*a*2 or the set of medium voltage (60V) battery packs 212*b*1. In this combination, the high voltage (120V) power tools 210*b* are configured to connect the two battery packs 212 in series. In this combination, the tool control module 14 of the high voltage (120V) power tools 210*b* recognizes the very high voltage (240V) output from the two high voltage (120V) battery packs 212*a*2 (connected in series)/input to the high voltage (120V) power tools 210*b* and adjusts the voltage input to the motor (M) 12.

FIG. 11H illustrates a combination of one of the power tools of the set of high voltage (120V) power tools 210*b* and one of the battery packs of the set of high voltage (120V) battery packs 212*b*2. The battery packs 212 may be implemented in different configurations having varying numbers, arrangements, and types of battery cells that are capable of having different operating characteristics in terms of rated voltages for the battery cells, impedance values for the battery cells, as well as different amp-hours (Ah) and watt-hours (Wh), as discussed in more detail below.

Each battery pack 214 may be implemented in different configurations having varying numbers, arrangements, and types of battery cells that are capable of having different operating characteristics in terms of nominal or operating voltages for the battery cells, impedance values for the battery cells, as well as different amp-hours (Ah) and watt-hours (Wh), as discussed in more detail below. Additional details related to the battery packs 212 and the example battery characteristics for each battery pack are discussed below.

The set of power tools 210 may be the similar to the set of power tools 110 of FIG. 8, and the set of battery packs 212 may be the same or similar to the set of battery packs 112 of FIG. 8. The power tools 110 may be configured to include the capability to connect the two battery packs 212 coupled to the power tool in series and/or parallel.

Figure 12:
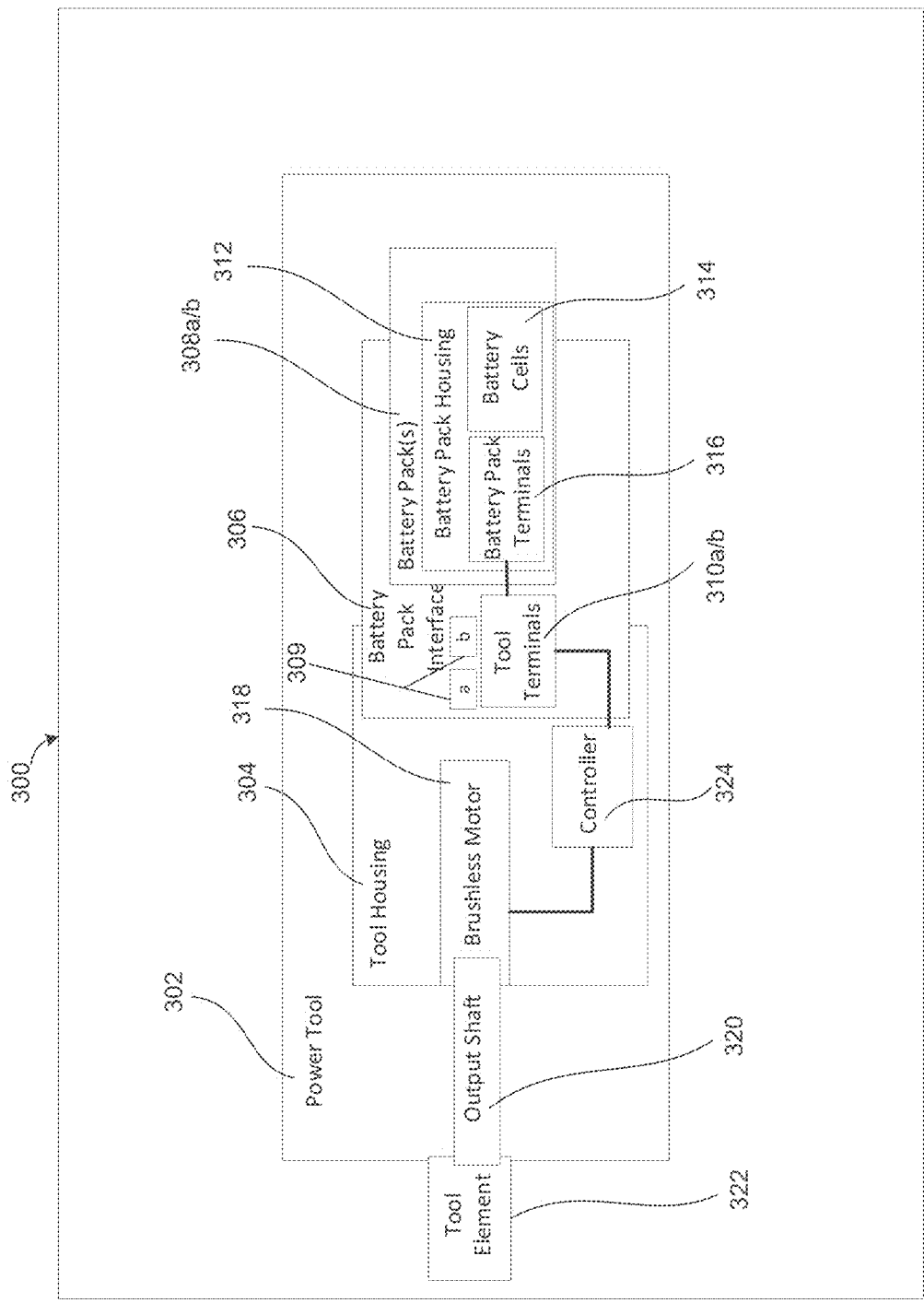
FIG. 12 is a block diagram of an example embodiment of a power tool system.

Referring to FIG. 12, an example block diagram of a power tool system 300 is illustrated. The power tool system 300 includes a power tool 302. The power tool 302 may include any of the power tools 110 of FIG. 8 and 210 of FIG. 10. For example, the power tool 302 may include a concrete saw, a circular saw, a chop saw, a chain saw or a grinder. Additionally, the power tool 302 may include other types of power tools and other types of equipment not illustrated or described with respect to FIGS. 8 and 10.

Each power tool 302 includes a tool housing 304. The tool housing 304 includes a battery pack interface 306. The battery pack interface 306 is configured to couple with at least one battery pack 308. The battery pack interface 306 includes, among other features, a set of tool terminals 310. The set of tool terminals 310 provide a point for an electrical interface between the power tool 302 and the battery pack 308. The battery pack interface 306 may include a single battery pack receptacle 309a for receiving a single battery pack 308. For instance, the battery pack receptacle 309a may be configured to receive a single battery pack 308 such as one of the battery packs of the set of battery packs 112 of FIG. 8. In some implementations, the battery pack receptacle 309 may include multiple receptacles 309a, 309b for receiving multiple battery packs 308a, 308b. For example, the battery pack receptacles 309a, 309b may each include a set of tool terminals 310a, 310b for coupling with two battery packs 308a, 308b, such as the battery packs 212 of FIG. 10.

The battery pack 308 includes a battery pack housing 312. The battery pack housing 312 operably couples with the battery pack interface 306 on the tool housing 304. The battery pack 308 includes a set of battery cells 314 that are disposed in the battery pack housing 312. The battery cells 314 may be configured in different numbers and different arrangements, as discussed in more detail above with respect to FIGS. 1-7. Different types of battery cells 314 may be used having different cell characteristics, as discussed in more detail above.

The battery pack 308 also includes a set of battery pack terminals 316. The battery pack terminals 316 may be disposed in the battery pack housing 312. The set of battery pack terminals 316 electrically connect to the set of tool terminals 310 to provide an electrical connection between the battery pack 308 and the power tool 302.

The power tool 302 also includes a brushless motor 318 that is disposed in the tool housing 304. The brushless motor 318 includes various motor components (not shown), including a stator and a rotor using permanent magnets attached on the rotor. The brushless motor 318 is discussed in more detail below. The brushless motor 318 includes an output shaft 320 that is coupled to drive a tool element 322. The tool element 322 may vary based on the type of power tool 302 in the power tool system 300. For example, the tool element may include a saw blade when the power tool 302 is a type of saw such as a concrete saw, a circular saw, or a chop saw. In another example, the tool element 322 may include a chain blade when the power tool 302 is a chain saw. In yet another example, the tool element 322 may include a cutting wheel or a grinding wheel when the power tool 302 is a grinder.

The power tool 302 includes a tool control module (also referred to as a controller) 324 that is disposed in the tool housing 304. The tool control module 324 is operably connected to the set of tool terminals 310 and to the brushless motor 318 to control power delivery to the brushless motor 318 from the battery pack 308. The tool control module 324 may include the same features and functionality as the tool control module in FIGS. 9A-9D and the tool control module in FIGS. 11A-11H. In some implementations, as discussed in detail below, the brushless motor 318 is operable under load to generate a maximum power output of between approximately 3000 W and 5000 W.

In an example embodiment, the power tool system 300 is operable under load to generate a maximum power output of between approximately 3000 W and 5000 W. In this first example embodiment, brushless motor 318 may include the following motor characteristics and the battery pack 308 may include the following battery pack characteristics. The brushless motor 318 includes a stator having an outer diameter of approximately 60 mm to approximately 100 mm, and in an embodiment up to approximately 90 mm, and in a further embodiment up to 80 mm. The brushless motor 318 includes a stack length of approximately 65% to approximately 135% of the outer diameter of the stator, in an embodiment 75% to approximately 125% of the outer diameter of the stator, and in a further embodiment 85% to 115% of the outer diameter of the stator. In an embodiment, a stator having a stack length of smaller than 65% of the stator diameter is not suitable to accommodate sufficient quantity of magnet wire to generate a maximum power output of between 3000 W and 5000 W. In an embodiment, a stator having a stack length of greater than 135% of the stator diameter causes too much vibration to be used for power tool applications. For example, if the outer diameter of the stator is approximately 60 mm, then the stack length may be approximately 45 mm (i.e., 75% of 60 mm) to approximately 75 mm (i.e., 125% of 60 mm). In another example, if the outer diameter of the stator is approximately 80 mm, then the stack length may be approximately 60 mm (i.e., 75% of 80 mm) to approximately 100 mm (i.e., 125% of 80 mm). Other stack lengths of the brushless motor 318 may be calculated in a similar manner based on other values of the outer diameter of the stator between approximately 60 mm and approximately 80 mm.

In the this example embodiment, the power tool system 300 includes a battery pack 308 including a set of battery cells 314 having at least 15 battery cells. In this example and other examples provided below, reference is also made back to the different battery cell arrangements described above with respect to FIGS. 6 and 7. Each of the at least 15 battery cells includes a nominal voltage of approximately 3.6 volts and an impedance of approximately ≤13 mΩ. The battery pack 308 has a nominal voltage of at least approximately 54 volts. The controller 324 controls power delivery from the battery pack 308 to the brushless motor 318 and the brushless motor 318 is operable under load to generate a maximum power output of between approximately 3000 W and approximately 5000 W. In this manner, the combination of the brushless motor 318 having these motor characteristics and the battery pack 308 having these battery pack characteristics provide a high power output to power the power tool 302.

In this example embodiment, the battery pack 308 may have other battery characteristics such that, in combination with the motor characteristics of the brushless motor 318, the power tool system 300 is operable under load to generate a maximum power output of between approximately 3000 W and approximately 5000 W. For example, in some implementations of the example embodiment, the battery pack 308 may include a set of battery cells 314 having at least 20 battery cells connected in series. Each of the 20 battery cells may have a nominal voltage of approximately 3.6 volts. The battery pack 308 may have a nominal voltage of at approximately 72 volts.

In some implementations of this example embodiment of the power tool system 300, the battery pack 308 may include a set of battery cells 314 having at least 30 battery cells connected in series or parallel or some combination thereof. Each of the 30 battery cells may have a nominal voltage of approximately 3.6 volts. The battery pack 308 may have a nominal voltage of approximately 54 volts or approximately 108 volts, depending upon how the cells are connected.

In some implementations of this example embodiment, the battery pack 308 may include a set of battery cells 314, where at least a portion of the battery cells are connected in series. For example, the set of battery cells 314 may include a string of battery cells where at least a portion of the battery cells 314 are connected in series to one another, such as the battery cells described above with respect to FIGS. 1-6. The set of battery cells 314 may include a string of battery cells where all of the battery cells are connected in series to one another.

In some implementations of this example embodiment, the set of battery cells 314 may include multiple strings of battery cells, such as the battery cells described above with respect to FIGS. 2-6. Each of the battery cells in a string may be connected in series to one another. Then, each string of battery cells may be connected in parallel to another string of battery cells. Multiple strings of battery cells that are connected in parallel provide a higher amount of Amp-hours and Watt-hours compared to a single string of battery cells. For instance, in some implementations, the set of battery cells 314 may include a first string of at least 15 battery cells connected in series and a second string of at least 15 battery cells connected in series. Each battery cell in the first string has a nominal voltage of approximately 3.6 volts. Each battery cell in the second string has a nominal voltage of approximately 3.6 volts. Then, the first string is connected in parallel to the second string.

In some implementations of this example embodiment of the power tool system 300, the battery pack 308 may include a set of battery cells 314 including more than two strings of battery cells, such as the battery cells described above with respect to FIGS. 4-6. For instance, the set of battery cells 314 may include a first string of at least 15 battery cells, a second string of at least 15 battery cells, and a third string of at least 15 battery cells. Each battery cell in the first string has a nominal voltage of approximately 3.6 volts and the battery cells in the first string are connected in series. Each battery cell in the second string has a nominal voltage of approximately 3.6 volts and the battery cells in the second string are connected in series. Each battery cell in the third string has a nominal voltage of approximately 3.6 volts and the battery cells in the third string are connected in series. Then, the first string, the second string, and the third string are connected in parallel.

In some implementations of this example embodiment, the power tool may receive and couple with multiple battery packs. For example, the system may include a first battery pack 308a and a second battery pack 308b, such as the battery packs 212 of FIG. 10. The first battery pack 308a and the second battery pack 308b have the same characteristics as the battery pack 308 described above. In some implementations, the first battery pack and the second battery pack are electrically connected in parallel. In some implementations, the first battery pack and the second battery pack are electrically connected in series.

In some implementations of this example embodiment, the combination of the brushless motor 318 motor characteristics and the battery pack 308 battery pack characteristics may be operable under load to output a power of approximately ≥5000 W.

In a second example embodiment, the power tool system 300 is operable under load to generate a maximum power output of between approximately 3000 W and 5000 W. In this second example embodiment, brushless motor 318 may include the following motor characteristics and the battery pack 308 may include the following battery pack characteristics. The brushless motor 318 includes a stator having an outer diameter of approximately 60 mm to approximately 100 mm, in an embodiment up to 90 mm, and in a further embodiment up to 80 mm. The brushless motor 318 includes a stack length of approximately 65% to approximately 135% of the outer diameter of the stator, in an embodiment 75% to approximately 125% of the outer diameter of the stator, and in a further embodiment 85% to 115% of the outer diameter of the stator. In an embodiment, a stator having a stack length of smaller than 65% of the stator diameter is not suitable to accommodate sufficient quantity of magnet wire to generate a maximum power output of between 3000 W and 5000 W. In an embodiment, a stator having a stack length of greater than 135% of the stator diameter causes too much vibration to be used for power tool applications. For example, if the outer diameter of the stator is approximately 60 mm, then the stack length may be approximately 45 mm (i.e., 75% of 60 mm) to approximately 75 mm (i.e., 125% of 60 mm). In another example, if the outer diameter of the stator is approximately 80 mm, then the stack length may be approximately 60 mm (i.e., 75% of 80 mm) to approximately 100 mm (i.e., 125% of 80 mm). Other stack lengths of the brushless motor 318 may be calculated in a similar manner based on other values of the outer diameter of the stator between approximately 60 mm and approximately 80 mm.

In this second example embodiment, the battery pack 308 includes a set of battery cells 314 having at least 20 battery cells. Each of the at least 20 battery cells has a nominal voltage of approximately 3.6 volts and an impedance of approximately ≤20 mΩ. The battery pack 308 has a nominal voltage of approximately 72 volts. In this example and other examples provided below, reference is also made back to the different battery cell arrangements described above with respect to FIGS. 6 and 7. The controller 324 controls power delivery from the battery pack 308 to the brushless motor 318 and the brushless motor 318 is operable under load to generate a maximum power output of between approximately 3000 W and approximately 5000 W.

In the second example embodiment, the battery pack 308 may have other battery characteristics such that, in combination with the motor characteristics of the brushless motor 318, the power tool system 300 is operable under load to generate a maximum power output of between approximately 3000 W and approximately 5000 W. For example, in some implementations of the second example embodiment, the battery pack 308 may have a nominal voltage of approximately 72 volts.

In some implementations of the second example embodiment, the battery pack 308 may include a set of battery cells 314 having at least 30 battery cells. Each of the 30 battery cells may have a nominal voltage of approximately 3.6 volts. The battery pack 308 may have a nominal voltage of approximately 54 volts or approximately 108 volts.

In some implementations of the second example embodiment, the battery pack 308 may include a set of battery cells 314, where at least a portion of the battery cells are connected in series, such as the battery cells described above with respect to FIGS. 1-6. For example, the set of battery cells 314 may include a string of battery cells where at least a portion of the battery cells 314 are connected in series to one another. The set of battery cells 314 may include a string of battery cells where all of the battery cells are connected in series to one another.

In some implementations of the second example embodiment, the battery pack 308 may include multiple battery packs. For example, the battery pack 308 may include a first battery pack and a second battery pack, such as the battery packs 212 of FIG. 10. The first battery pack may include a set of battery cells, where the set of battery cells includes at least 20 battery cells each having a nominal voltage of approximately 3.6 volts and an impedance of approximately ≤20 mΩ. The first battery pack has a nominal voltage of at least approximately 72 volts. The second battery pack may include a set of battery cells, where the set of battery cells includes at least 20 battery cells each having a nominal voltage of approximately 3.6 volts and an impedance of approximately ≤20 mΩ. The second battery pack has a nominal voltage of at least approximately 72 volts. In some implementations, the first battery pack is electrically connected in parallel to the second battery pack. In some implementations, the first battery pack is electrically connected in with to the second battery pack.

In some implementations of the second example embodiment, the combination of the brushless motor 318 motor characteristics and the battery pack 308 battery pack characteristics may be operable under load to output a power of approximately ≥5000 W.

Figure 13B:
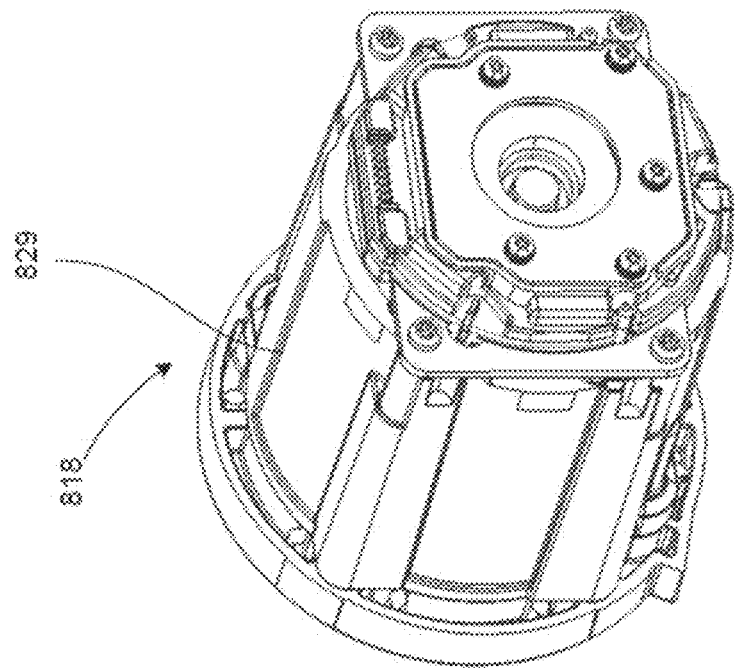
FIGS. 13A and 13B illustrate example perspective front and rear views of an example brushless motor.
Figure 13A:
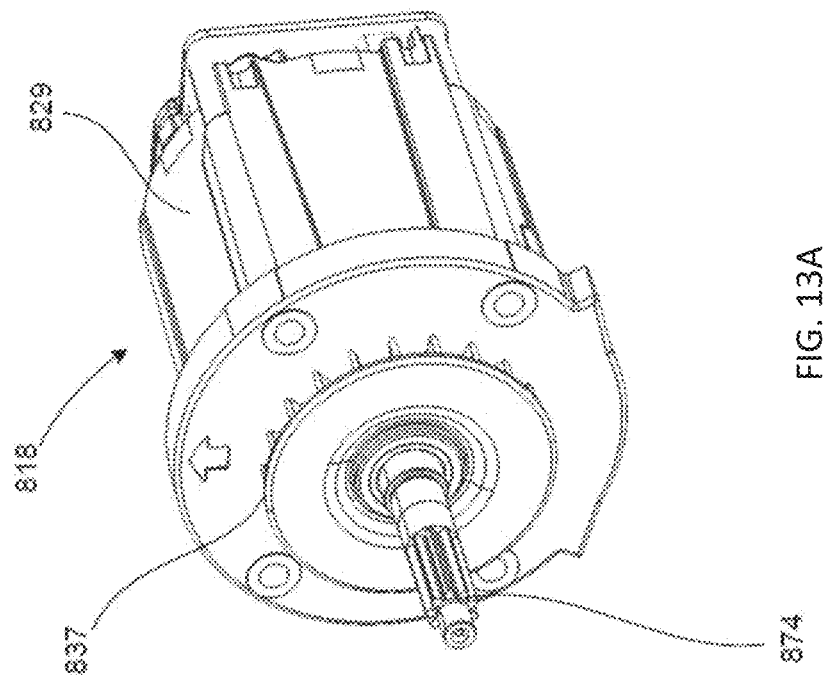
Figure 14A:
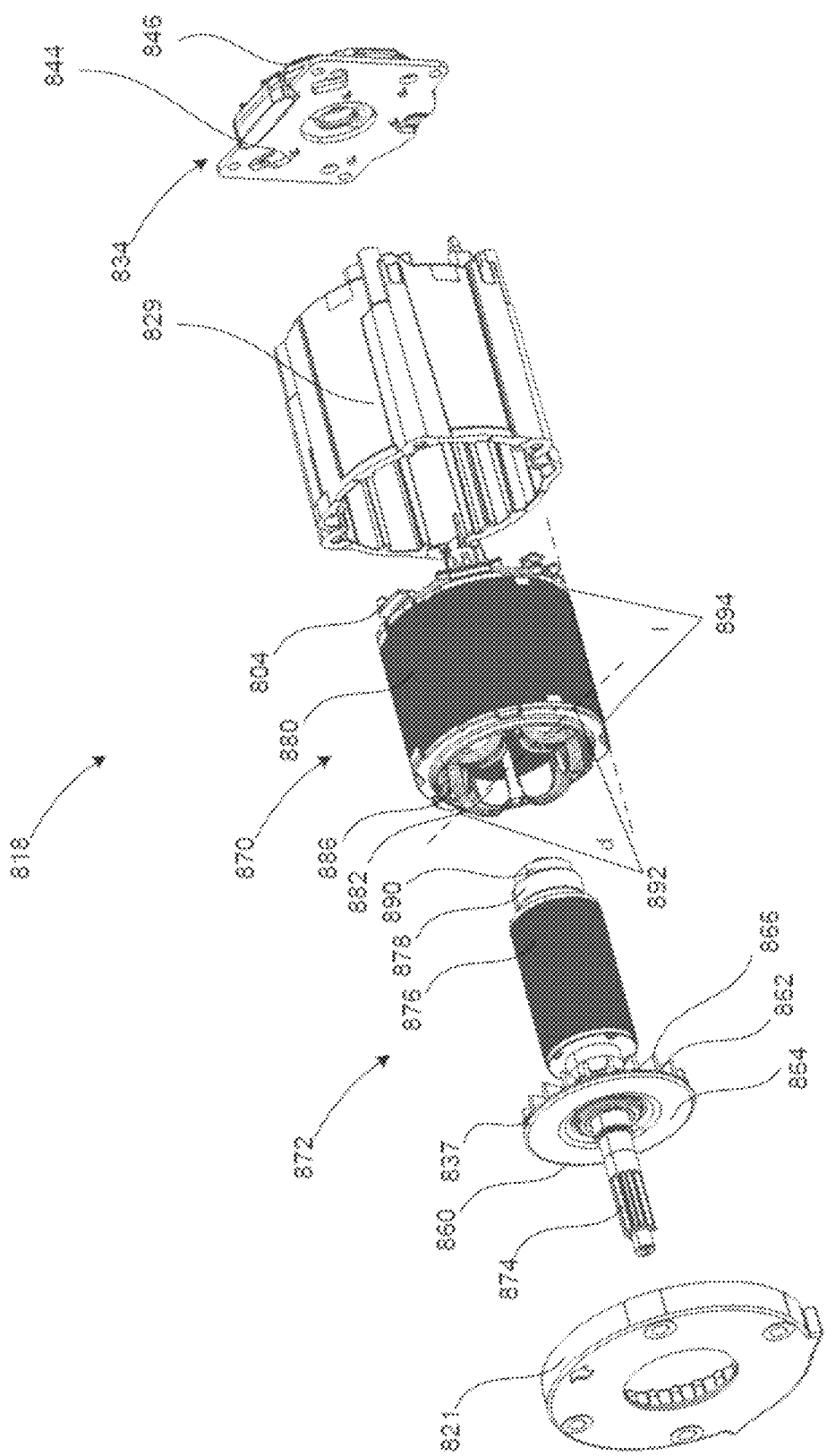
FIG. 14A illustrates a perspective exploded view of the example brushless motor of FIGS. 13A and 13B.
Figure 14B:
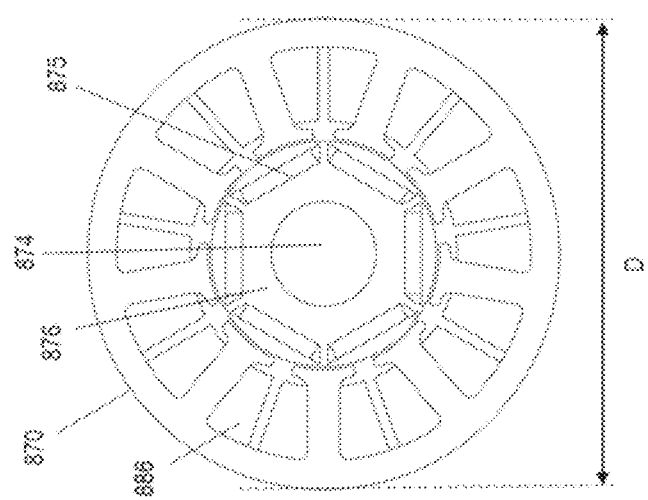
FIG. 14B illustrates an axial cross-sectional view of the example brushless motor.

FIGS. 13A and 13B illustrate example perspective front and rear views of an example brushless motor 818. FIG. 14A illustrates a perspective exploded view of the example brushless motor 818 of FIGS. 13A and 13B. FIG. 14B illustrates a cross-sectional axial view of the example brushless motor 818. The brushless motor 818 is an example implementation of the brushless motor 318 described above. As shown in these figures, the brushless motor 818 is a three-phase brushless DC (BLDC) motor having a can or motor housing 829 sized to receive a stator assembly 870 and a rotor assembly 872. A front cap 821 at least partially encloses the stator assembly 870 and the rotor assembly 872 in the motor housing 818. Various aspects and features of the motor 818 are described herein in detail. As noted above, the motor 818 may be used in any power tool or any other device or apparatus such as the example power tools 302 of the power tool system 300 of FIG. 12 and in any of the motors referenced in FIGS. 1-11.

In an embodiment, rotor assembly 872 includes a rotor shaft 874, a rotor lamination stack 876 mounted on and rotatably attached to the rotor shaft 874, a rear bearing 878 arranged to axially secure the rotor shaft 874 to the motor housing 829, a sense magnet ring 890 attached to a distal end of the rotor shaft 874, and fan 837 also mounted on and rotatably attached to the rotor shaft 874. The rotor shaft 874 also may be referred to interchangeably an output shaft and is an example of the output shaft 320 of FIG. 12 that is operably coupled to and drives a tool element, such as the tool element 322 of FIG. 12. In various implementations, the rotor lamination stack 876 can include a series of flat laminations attached together via, for example, an interlock mechanical, an adhesive, an overmold, etc., that house or hold two or more permanent magnets (PMs) 875 therein. The permanent magnets 875 may be surface mounted on the outer surface of the lamination stack 876 or housed therein.

The permanent magnets 875 may be, for example, a set of four PMs that magnetically engage with the stator assembly 870 during operation. Adjacent PMs have opposite polarities such that the four PMs have, for example, an N-S-N-S polar arrangement. The rotor shaft 874 is securely fixed inside the rotor lamination stack 876. Rear bearing 878 provides longitudinal support for the rotor 874 in a bearing pocket of the motor housing 829. In an embodiment, rotor assembly 872 may be a four-pole motor including a series of four permanent magnets provided on the rotor lamination stack 876, though in the example of FIG. 14B, the rotor assembly 872 is a six-pole rotor including six permanent magnets 875 provided on the rotor lamination stack 876.

In an embodiment, stator assembly 870 includes a generally cylindrical lamination stack 880 having center bore configured to receive the rotor assembly 872. Lamination stack 880 further includes a plurality of stator teeth 882 extending inwardly from a stator ring towards the center bore. The stator teeth define 882 a plurality of slots there between configured. A plurality of coil windings 886 are wound around the stator teeth 882 into the slots. Coil windings 886 may be wound and connected together in various configurations. In an embodiment, where motor 818 is a three-phase BLDC motor, a total of six coil windings 886 may be provided. Alternatively, as shown in the example of FIG. 14B, a total of nine coil windings 886 may be provided as a function of the number of poles provided on the rotor assembly 872. Terminals 804 are coupled to the coil windings 886. Although three terminals 804 are depicted herein, in an embodiment, one terminal 804 may be provided for each coil winding 886 for a total of six or nine terminals 804.

The stator 870 includes an outer diameter (d) 892. The outer diameter (d) 892 may be measured from one point on the lamination stack 880 through the center of the bore of the stator 870 to an opposite point on the lamination stack 880. The brushless motor 818 may be implemented using different sized stators having different outer diameters. For example, according to the first example embodiment and the second example embodiment described above, the outer diameter (d) 892 of the stator 870 may be between approximately 60 mm and approximately 100 mm, in an embodiment up to 92 mm, and in a further embodiment up to 86 mm, and in a yet further embodiment up to 80 mm. The other components of the brushless motor 818 (e.g., the motor housing 829) may be sized accordingly based on the particular outer diameter (d) 892 of the stator 870 for a particular motor. The outer diameter (d) 892 of the stator 870 may be sized to ensure that the maximum power output by the brushless motor 818 under load is approximately between 3000 W and approximately 5000 W. In some implementations, maximum power output by the brushless motor 818 under load may be >5000 W.

The stator 870 includes a stack length (l) 894. The stack length (l) 894 may be measured from one edge of the lamination stack 880 along the length of the stator 870 to an opposite edge of the lamination stack 880. The size of the stack length (l) 894 may be based upon a percentage of the size of the outer diameter (d) 892 of the stator 870. For example, according to the first example embodiment and the second example embodiment described above, the stack length (l) 894 may be approximately 65% to approximately 135% of the outer diameter (d) 892 of the stator 870, in an embodiment 75% to approximately 125% of the outer diameter (d) 892 of the stator 870, and in a further embodiment 85% to 115% of the outer diameter (d) 892 of the stator 870. For one example, a stator 870 having an outer diameter (d) 892 of approximately 60 mm may have a stack length (l) 894 of approximately 45 mm (i.e., 75% of 60 mm) to approximately 75 mm (i.e., 125% of 60 mm). In another example, a stator 870 having an outer diameter (d) 892 of approximately 80 mm may have a stack length (l) 894 of approximately 60 mm (75% of 80 mm) to approximately 100 mm (125% of 80 mm). The stack length (l) 894 may be sized on cooperation with the outer diameter (d) 892 of the stator 870 to ensure that the maximum power output by the motor 818 under load is approximately 3000 W to approximately 5000 W. In some implementations, maximum power output by the brushless motor 818 under load may be >5000 W.

In an embodiment, the aforementioned dimensions of the stator outer diameter (d) and stator length (l) allow the stator 870 to accommodate a larger volume of magnet wire. This may be accomplished by providing thicker magnet wires and/or increased number of turns of the magnet wires around the stator teeth in comparison to conventional power tool stators. Thicker magnet wires exhibit lower electrical resistance and contribute to an overall reduction of motor impedance. Thus, for a same given output speed of the motor, increasing the stator magnet wire thickness results in higher output torque and higher maximum power output. In an embodiment, the stator 870 is provided with magnet wires having a thickness of at least 1.1 mm, in a further embodiment at least 1.2 mm, in a yet further embodiment at least 1.3 mm, and in a yet further embodiment at least 1.4 mm. To achieve a power range of 3000 W to 5000 W, this arrangement provides a motor having a total weight (including the total weight of the stator assembly 870 and the rotor assembly 872, including the rotor shaft 874, the sense magnet 890, the rear bearing 878, and the fan 860) of approximately 750 grams to 1800 grams, or more preferably 800 grams to 1750 grams. Specifically, in an embodiment, the motor 818, as configured to produce a maximum cold power output of up to 3500 watts, has a total weight of at most approximately 800 grams; as configured to produce a maximum col power output of up to 4000 watts, has a total weight of at most approximately 1250 grams; as configured to produce a maximum col power output of up to 4500 watts, has a total weight of at most approximately 1550 grams; and as configured to produce a maximum col power output of up to 5000 watts, has a total weight of at most approximately 1750 grams. The motor as described herein produces a total hot power output of 2400 watts to 3750 watts, where hot power output is defined as the power output that can be sustained indefinitely and within thermal limits of the battery pack continuously for a minimum of five minutes. The motor as described herein also produces a total torque in the range of 1.8 to 4 Newton-meters. This arrangement results in the motor 818 having a total impedance of no greater than 0.017Ω in an embodiment, no greater than 0.012Ω in a further embodiment, no greater than 0.009Ω in a yet further embodiment, and no greater than 0.005Ω in a further embodiment.

In an embodiment, fan 837 of the rotor assembly 872 includes a back plate 860 having a first side 862 facing the motor case and a second side 864 facing the gear case. A plurality of blades 866 extend axially outwardly from first side 862 of the back plate 860. Blades 866 rotate with the rotor shaft 874 to generate an air flow. When motor 818 is fully assembled, fan 837 is located at or outside an open end of the motor housing 829 with a baffle (not shown) arranged between the stator assembly 870 and the fan 837. The baffle guides the flow of air from the blades 866 towards exhaust vents. Additional details and arrangements related to the brushless motor 818, including operation and control details, are disclosed in US Patent Publication No. 2018/0109210, which is hereby incorporated by reference in its entirety.

Power module 834 in the illustrated example is provided adjacent the motor housing 829. In an embodiment, power module 834 includes a heat sink 844 and a circuit board 846. Power switching components may be mounted on the circuit board 846 in close proximity to the heat sink 844. In an embodiment, a series of positional sensors (e.g., hall sensors) may also be provided as a part of the power module 834 in close proximity to sense magnet ring 890 to sense the magnetic rotational position of the sense magnet ring 890. In this embodiment, terminals 804 protrude from the back of the motor housing 829 and are received into corresponding slots of the power module 834.

It must be understood that while power module 834 in this embodiment is provided adjacent the motor housing 829, the circuit board for the power switching components may be provided anywhere in the power tool, including, but not limited to, below the motor housing 829, or in a handle portion of the tool. In other power tools, such as drills or impact drivers, the circuit board may be provided in the tool handle. An example of such an arrangement is disclosed in US Patent Publication No. 2015/0280517, which is incorporated herein by reference in its entirety.

As discussed above with respect to FIG. 12, the controller 324 is operably connected to the set of tool terminals 310 and to the brushless motor 318 to control power delivery to the brushless motor 318 from the battery pack 308. In some implementations, a control scheme may be implemented using the controller 324 to increase the power output of the power tool 302 using conduction band and advance angle.

For example, such an implementation may be used in conjunction with the first example embodiment and the second example embodiment described above. For instance, the power tool 302 includes the brushless motor 318 having a stator defining a plurality of phases, a switching arrangement having a plurality of motor switches connected electrically between a power source (e.g., the battery pack 308) and the brushless motor 308 and operates to deliver power to the brushless motor 318, an input unit operable between a first position and a second position and outputs a signal indicating an amount of power to be delivered to the brushless motor 318 and a controller 324 interfaced with the input unit and the plurality of motor switches. For each phase, the controller 324 operates to output a pulse-width modulated (PWM) signal having a duty cycle to one or more of the plurality of motor switches to control supply of power to the brushless motor 318. For each phase, the controller 324 operates to control one or more of a conduction band of the one or more of the plurality of motor switches and an advance angle of the conduction band. For each phase, the controller 324 operates to vary power output to the brushless motor 318 between a first power and a second power by varying the duty cycle of the PWM signal while keeping the conduction band and the advance angle at a predetermined value in response to the input unit moving between the first position and a predetermined position between the first and second positions. For each phase, the controller 324 operates to increase the power output to the brushless motor 318 to greater than the second power by increasing the one or more of the conduction band and the advance angle to greater than the predetermined value while keeping the duty cycle constant in response to the input unit moving between the predetermined position and the second position. Additional details regarding the control scheme and the use of the conduction band and advance angle are disclosed in U.S. Pat. No. 10,243,491, which is hereby incorporated by reference in its entirety.

Figures 15A, 15B:
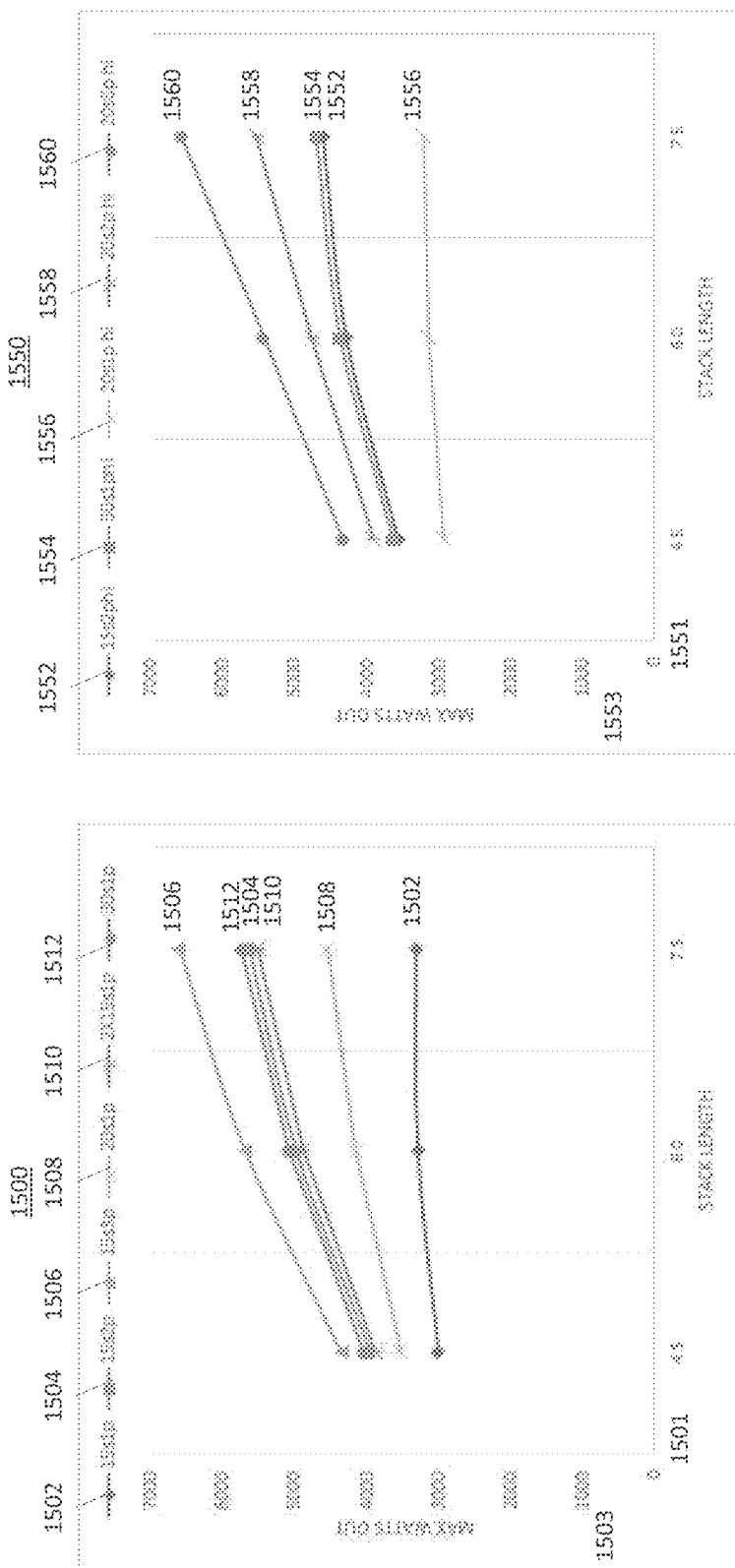
FIGS. 15A and 15B are example graphs illustrating a power tool output power in various combinations of motor sizes and battery packs.

FIGS. 15A and 15B are example graphs illustrating output power of a power tool in various combinations of motor sizes and battery packs. The graph 1500 in FIG. 15A illustrates experimental test results using simulation software for the maximum (max) watts out (i.e., the maximum power out) for an example power tool with no current limits and a fully charged battery pack(s). The power tool under simulation may be one of the power tools 110 of FIG. 8 or 210 of FIG. 10. In the graph 1500, the example power tool has a brushless motor with a stator diameter (motor diameter) of 60 mm. The x-axis 1501 represents varying motor stack lengths in the ranges of approximately 75% to approximately 125% of the 60 mm stator diameter. The y-axis 1503 represents the max watts out for various different battery packs 1502, 1504, 1506, 1508, 1510, and 1512 and different motor stack lengths. The battery packs 1502, 1504, 1506, 1508, 1510, and 1512 include battery cells having a nominal voltage of approximately 3.6 v and an impedance of approximately 13 mΩ. For the battery packs 1502, 1504, 1506, 1508, 1510, and 1512, reference is made to the descriptions of battery packs described above with respect to FIGS. 1-7, 9A-9D, and 11A-H.

The battery pack 1502 is a 15s1p battery pack, which is a battery pack having a single string of 15 battery cells in series. The battery pack 1504 is a 15s2p battery pack, which is a battery pack having two strings of 15 battery cells in series with the first string connected in parallel with the second string. Battery pack 1504 has a total battery impedance of approximately 85 to 137 mΩ, and more preferably 95 to 120 mΩ. The volume of battery pack 1504 is approximately in the range of $17.2 \times 10^5$ mm^3 to $30 \times 10^5$ mm^3, and preferably $22.2 \times 10^5$ mm^3 to $25 \times 10^5$ mm^3. The battery pack 1506 is a 15s3p battery pack, which is a battery pack having three strings of 15 battery cells in series with the first string, the second string, and the third string connected in parallel with each other. Battery pack 1506 has a total battery impedance of approximately 60 to 105 mΩ, and more preferably 70 to 95 mΩ. The volume of battery pack 1506 is approximately in the range of $25.8 \times 10^5$ mm^3 to $45 \times 10^5$ mm^3, and preferably $32.2 \times 10^5$ mm^3 to $40 \times 10^5$ mm^3. The battery pack 1508 is a 20s1p battery pack, which is a battery pack having a single string of 20 battery cells in series. The battery packs 1510 are two 15s1p battery packs connected in series. The battery pack 1512 is 30s1p battery pack, which is a battery pack having a single string of 30 battery cells in series.

In general, the graph 1500 shows that a power tool using one of the battery packs 1502, 1504, 1506, 1508, 1510, and 1512 and having a motor diameter of 60 mm has a max watts out of at least approximately 3000 W across varying motor stack lengths that are between approximately 75% and approximately 125% of the motor diameter. In some combinations, the graph 1500 illustrates that the max watts out is between approximately 3000 W and approximately 5000 W. In some combinations, the graph 1500 illustrates that the max watts out is greater than approximately 5000 W.

The graph 1550 in FIG. 15B illustrates experimental test results using simulation software for the maximum (max) watts out (i.e., the maximum power out) for an example power tool with no current limits and a fully charged battery pack(s). The power tool under simulation may be one of the power tools 110 of FIG. 8 or 210 of FIG. 10. In the graph 1550, the example power tool has a brushless motor with a stator diameter (motor diameter) of 60 mm. The x-axis 1551 represents varying motor stack lengths in the ranges of approximately 75% to approximately 125% of the 60 mm stator diameter. The y-axis 1553 represents the max watts out for various different battery packs 1552, 1554, 1556, 1558, and 1560 and different motor stack lengths. The battery packs 1552, 1554, 1556, 1558, and 1560 include battery cells having a nominal voltage of approximately 3.6 v and an impedance of approximately 20 mΩ. For the battery packs 1552, 1554, 1556, 1558, and 1560, reference is made to the descriptions of battery packs described above with respect to FIGS. 1-7, 9A-9D, and 11A-H.

The battery pack 1552 is a 15s2p battery pack, which is a battery pack having two strings of 15 battery cells in series with the first string connected in parallel with the second string. The battery pack 1554 is 30s1p battery pack, which is a battery pack having a single string of 30 battery cells in series. The battery pack 1556 is a 20s1p battery pack, which is a battery pack having a single string of 20 battery cells in series. The battery pack 1558 is a 20s2p battery pack, which is a battery pack having two strings of 20 battery cells in series with the first string connected in parallel with the second string. The battery pack 1560 is a 20s3p battery pack, which is a battery pack having three strings of 20 battery cells in series with the first string, the second string, and the third string connected in parallel with each other.

In general, the graph 1550 shows that a power tool using one of the battery packs 1552, 1554, 1556, 1558, and 1560 and having a motor diameter of 60 mm has a max watts out of at least approximately 3000 W across varying motor stack lengths that are between approximately 75% and approximately 125% of the motor diameter. In some combinations, the graph 1550 illustrates that the max watts out is between approximately 3000 W and approximately 5000 W. In some combinations, the graph 1550 illustrates that the max watts out is greater than approximately 5000 W.

Figures 16A, 16B:
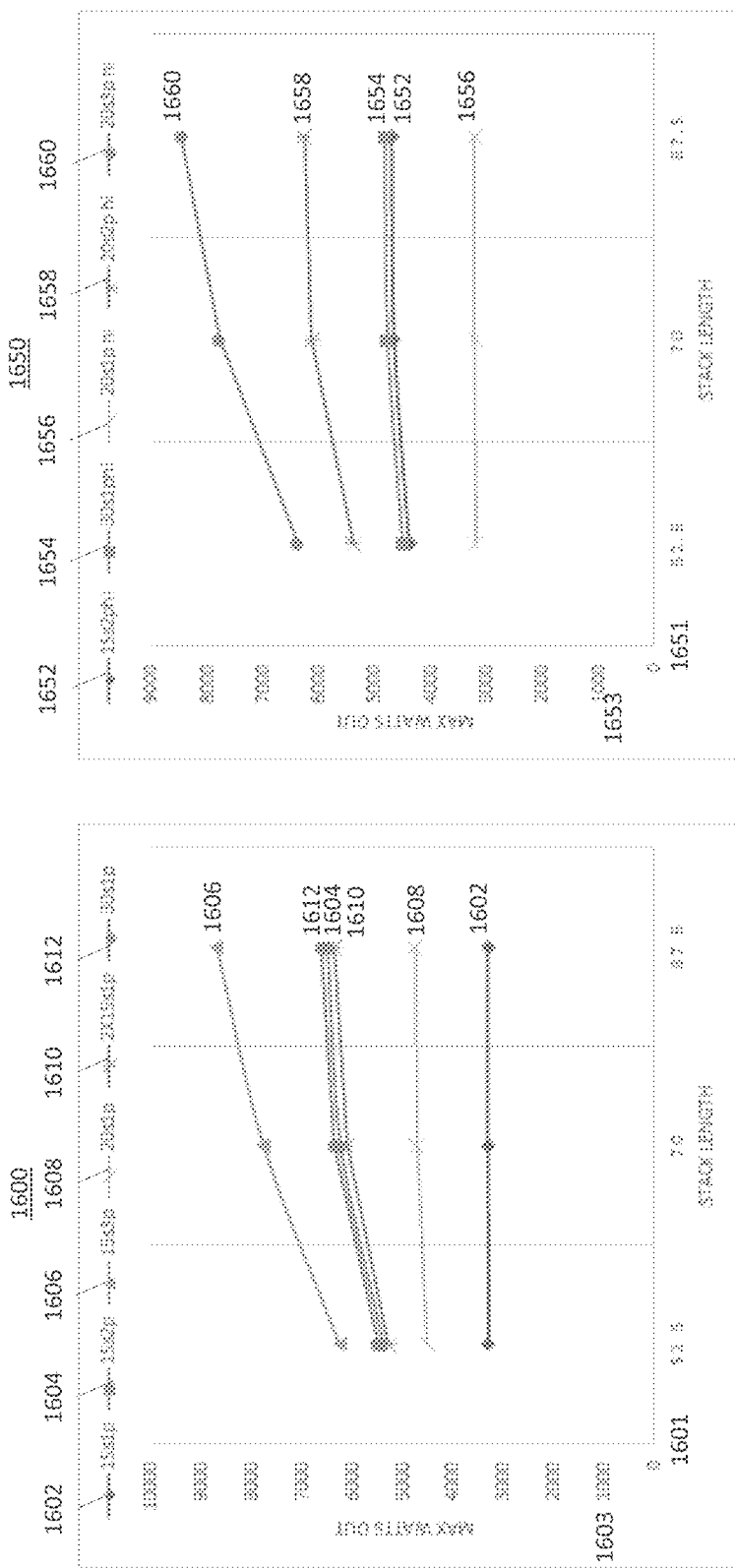
FIGS. 16A and 16B are example graphs illustrating a power tool output power in various combinations of motor sizes and battery packs.

FIGS. 16A and 16B are example graphs illustrating a power tool output power in various combinations of motor sizes and battery packs. The graph 1600 in FIG. 16A illustrates experimental test results using simulation software for the maximum (max) watts out (i.e., the maximum power out) for an example power tool with no current limits and a fully charged battery pack(s). The power tool under simulation may be one of the power tools 110 of FIG. 8 or 210 of FIG. 10. In the graph 1600, the example power tool has a brushless motor with a stator diameter (motor diameter) of 70 mm. The x-axis 1601 represents varying motor stack lengths in the ranges of approximately 75% to approximately 125% of the 70 mm stator diameter. The y-axis 1603 represents the max watts out for various different battery packs 1602, 1604, 1606, 1608, 1610, and 1612 and different motor stack lengths. The battery packs 1602, 1604, 1606, 1608, 1610, and 1612 include battery cells having a nominal voltage of approximately 3.6 v and an impedance of approximately 13 mΩ. For the battery packs 1602, 1604, 1606, 1608, 1610, and 1612, reference is made to the descriptions of battery packs described above with respect to FIGS. 1-7, 9A-9D, and 11A-H.

The battery pack 1602 is a 15s1p battery pack, which is a battery pack having a single string of 15 battery cells in series. The battery pack 1604 is a 15s2p battery pack, which is a battery pack having two strings of 15 battery cells in series with the first string connected in parallel with the second string. The battery pack 1606 is a 15s3p battery pack, which is a battery pack having three strings of 15 battery cells in series with the first string, the second string, and the third string connected in parallel with each other. The battery pack 1608 is a 20s1p battery pack, which is a battery pack having a single string of 20 battery cells in series. The battery packs 1610 are two 15s1p battery packs connected in series. The battery pack 1612 is 30s1p battery pack, which is a battery pack having a single string of 30 battery cells in series.

In general, the graph 1600 shows that a power tool using one of the battery packs 1602, 1604, 1606, 1608, 1610, and 1612 and having a motor diameter of 70 mm has a max watts out of at least approximately 3000 W across varying motor stack lengths that are between approximately 75% and approximately 125% of the motor diameter. In some combinations, the graph 1600 illustrates that the max watts out is between approximately 3000 W and approximately 5000 W. In some combinations, the graph 1500 illustrates that the max watts out is greater than approximately 5000 W.

The graph 1650 in FIG. 16B illustrates experimental test results using simulation software for the maximum (max) watts out (i.e., the maximum power out) for an example power tool with no current limits and a fully charged battery pack(s). The power tool under simulation may be one of the power tools 110 of FIG. 8 or 210 of FIG. 10. In the graph 1650, the example power tool has a brushless motor with a stator diameter (motor diameter) of 70 mm. The x-axis 1651 represents varying motor stack lengths in the ranges of approximately 75% to approximately 125% of the 70 mm stator diameter. The y-axis 1653 represents the max watts out for various different battery packs 1652, 1654, 1656, 1658, and 1660 and different motor stack lengths. The battery packs 1652, 1654, 1656, 1658, and 1660 include battery cells having a nominal voltage of approximately 3.6 v and an impedance of approximately 20 mΩ. For the battery packs 1652, 1654, 1656, 1658, and 1660, reference is made to the descriptions of battery packs described above with respect to FIGS. 1-7, 9A-9D, and 11A-H.

The battery pack 1652 is a 15s2p battery pack, which is a battery pack having two strings of 15 battery cells in series with the first string connected in parallel with the second string. The battery pack 1654 is 30s1p battery pack, which is a battery pack having a single string of 30 battery cells in series. The battery pack 1656 is a 20s1p battery pack, which is a battery pack having a single string of 20 battery cells in series. The battery pack 1658 is a 20s2p battery pack, which is a battery pack having two strings of 20 battery cells in series with the first string connected in parallel with the second string. The battery pack 1660 is a 20s3p battery pack, which is a battery pack having three strings of 20 battery cells in series with the first string, the second string, and the third string connected in parallel with each other.

In general, the graph 1650 shows that a power tool using one of the battery packs 1652, 1654, 1656, 1658, and 1660 and having a motor diameter of 70 mm has a max watts out of at least approximately 3000 W across varying motor stack lengths that are between approximately 75% and approximately 125% of the motor diameter. In some combinations, the graph 1650 illustrates that the max watts out is between approximately 3000 W and approximately 5000 W. In some combinations, the graph 1650 illustrates that the max watts out is greater than approximately 5000 W.

Figures 17A, 17B:
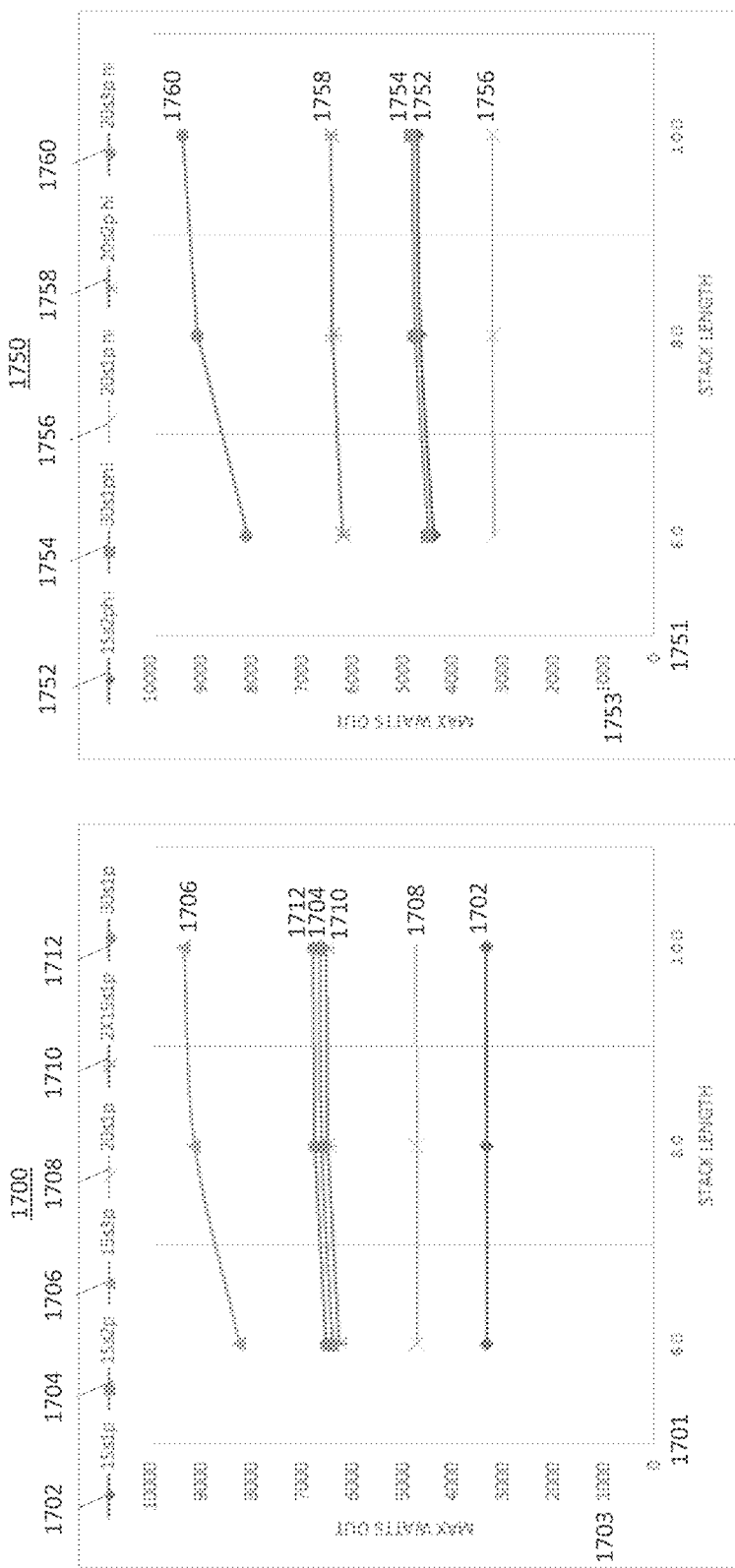
FIGS. 17A and 17B are example graphs illustrating a power tool output power in various combinations of motor sizes and battery packs.

FIGS. 17A and 17B are example graphs illustrating a power tool output power in various combinations of motor sizes and battery packs. The graph 1700 in FIG. 17A illustrates experimental test results using simulation software for the maximum (max) watts out (i.e., the maximum power out) for an example power tool with no current limits and a fully charged battery pack(s). The power tool under simulation may be one of the power tools 110 of FIG. 8 or 210 of FIG. 10. In the graph 1700, the example power tool has a brushless motor with a stator diameter (motor diameter) of 80 mm. The x-axis 1701 represents varying motor stack lengths in the ranges of approximately 75% to approximately 125% of the 80 mm stator diameter. The y-axis 1703 represents the max watts out for various different battery packs 1702, 1704, 1706, 1708, 1710, and 1712 and different motor stack lengths. The battery packs 1702, 1704, 1706, 1708, 1710, and 1712 include battery cells having a nominal voltage of approximately 3.6 v and an impedance of approximately 13 mΩ. For the battery packs 1702, 1704, 1706, 1708, 1710, and 1712, reference is made to the descriptions of battery packs described above with respect to FIGS. 1-7, 9A-9D, and 11A-H.

The battery pack 1702 is a 15s1p battery pack, which is a battery pack having a single string of 15 battery cells in series. The battery pack 1704 is a 15s2p battery pack, which is a battery pack having two strings of 15 battery cells in series with the first string connected in parallel with the second string. The battery pack 1706 is a 15s3p battery pack, which is a battery pack having three strings of 15 battery cells in series with the first string, the second string, and the third string connected in parallel with each other. The battery pack 1708 is a 20s1p battery pack, which is a battery pack having a single string of 20 battery cells in series. The battery packs 1710 are two 15s1p battery packs connected in series. The battery pack 1712 is 30s1p battery pack, which is a battery pack having a single string of 30 battery cells in series.

In general, the graph 1700 shows that a power tool using one of the battery packs 1702, 1704, 1706, 1708, 1710, and 1712 and having a motor diameter of 80 mm has a max watts out of at least approximately 3000 W across varying motor stack lengths that are between approximately 75% and approximately 125% of the motor diameter. In some combinations, the graph 1700 illustrates that the max watts out is between approximately 3000 W and approximately 5000 W. In some combinations, the graph 1700 illustrates that the max watts out is greater than approximately 5000 W.

The graph 1750 in FIG. 17B illustrates experimental test results using simulation software for the maximum (max) watts out (i.e., the maximum power out) for an example power tool with no current limits and a fully charged battery pack(s). The power tool under simulation may be one of the power tools 110 of FIG. 8 or 210 of FIG. 10. In the graph 1750, the example power tool has a brushless motor with a stator diameter (motor diameter) of 80 mm. The x-axis 1751 represents varying motor stack lengths in the ranges of approximately 75% to approximately 125% of the 80 mm stator diameter. The y-axis 1753 represents the max watts out for various different battery packs 1752, 1754, 1756, 1758, and 1760 and different motor stack lengths. The battery packs 1752, 1754, 1756, 1758, and 1760 include battery cells having a nominal voltage of approximately 3.6 v and an impedance of approximately 20 mΩ. For the battery packs 1752, 1754, 1756, 1758, and 1760, reference is made to the descriptions of battery packs described above with respect to FIGS. 1-7, 9A-9D, and 11A-H.

The battery pack 1752 is a 15s2p battery pack, which is a battery pack having two strings of 15 battery cells in series with the first string connected in parallel with the second string. The battery pack 1754 is 30s1p battery pack, which is a battery pack having a single string of 30 battery cells in series. The battery pack 1756 is a 20s1p battery pack, which is a battery pack having a single string of 20 battery cells in series. The battery pack 1758 is a 20s2p battery pack, which is a battery pack having two strings of 20 battery cells in series with the first string connected in parallel with the second string. The battery pack 1760 is a 20s3p battery pack, which is a battery pack having three strings of 20 battery cells in series with the first string, the second string, and the third string connected in parallel with each other.

In general, the graph 1750 shows that a power tool using one of the battery packs 1752, 1754, 1756, 1758, and 1760 and having a motor diameter of 80 mm has a max watts out of at least approximately 3000 W across varying motor stack lengths that are between approximately 75% and approximately 125% of the motor diameter. In some combinations, the graph 1750 illustrates that the max watts out is between approximately 3000 W and approximately 5000 W. In some combinations, the graph 1750 illustrates that the max watts out is greater than approximately 5000 W.

FIG. 18 illustrates an example table 1800. The table 1800 illustrates test results for an example power tool system, such as the power tool system 300 of FIG. 12, using different power sources. In this example table 1800, an angle grinder was used as the power tool 302. Examples of an angle grinder are illustrated by the angle grinder 124a or 124b of FIG. 8 or the angle grinder 224a or 224b of FIG. 10. For the angle grinder tested, the brushless motor in the angle grinder (e.g., the brushless motor 318 of FIG. 12) included a stator diameter of 61 mm and a stack length of 60 mm. The angle grinder was tested using three different power sources (e.g., battery pack 308 of FIG. 12) to determine the Watts OUT for each of the different power sources using the brushless motor having the stator diameter of 61 mm and the stack length of 60 mm.

The first power source tested is labelled as 15S1P meaning that the power source was a battery pack having one string of 15 battery cells connected in series, with each battery cell having a nominal voltage of approximately 3.6V and an impedance of approximately ≤13 mΩ. The rated voltage of the battery pack is 60V, having an approximate nominal voltage of 54V. As can be seen in the table 1800, the angle grinder operating under a load test with these motor characteristics and battery characteristics has a power output (Watts OUT) of between approximately 3000 W and approximately 5000 W. Specifically, the Watts OUT is 2982.576 W under the test conditions, which is approximately 3000 W.

The second power source tested is labelled as 15S2P meaning that the power source was a battery pack having two strings of 15 battery cells. The battery cells within each string are connected in series, with each battery cell having a nominal voltage of approximately 3.6V and an impedance of approximately ≤13 mΩ. The two strings of battery cells are connected in parallel to each other. The rated voltage of the battery pack is 60V, having an approximate nominal voltage of 54V. As can be seen in the table 1800, the angle grinder operating under a load test with these motor characteristics and battery characteristics has a power output (Watts OUT) of between approximately 3000 W and approximately 5000 W. Specifically, the Watts OUT is 3550.927 W under the test conditions.

The third power source tested is labelled as 15S3P meaning that the power source was a battery pack having three strings of 15 battery cells. The battery cells within each string are connected in series, with each battery cell having a nominal voltage of approximately 3.6V and an impedance of approximately ≤13 mΩ. The three strings of battery cells are connected in parallel to each other. The rated voltage of the battery pack is approximately 60V, with an approximate nominal voltage of 54V. As can be seen in the table 1800, the angle grinder operating under a load test with these motor characteristics and battery characteristics has a power output (Watts OUT) of between approximately 3000 W and approximately 5000 W. Specifically, the Watts OUT is 3740.706 W under the test conditions.

According to one general aspect, a power tool system includes a power tool having a tool housing. The tool housing includes a battery pack receptacle and the battery pack receptacle includes a set of tool terminals. The power tool includes a brushless motor that is disposed in the tool housing. The brushless motor includes an output shaft operably coupled to drive a tool element, a stator having an outer diameter of approximately 60 mm to approximately 80 mm, and a stack length of approximately 75% to approximately 125% of the outer diameter of the stator. The power tool includes a controller that is disposed in the tool housing and is operably connected to the set of tool terminals and to the brushless motor to control power delivery to the brushless motor. The power tool system includes a battery pack. The battery pack includes a battery pack housing operably connectable to the battery pack receptacle on the tool housing, a set of battery cells disposed in the battery pack housing, where the set of battery cells include at least 15 battery cells each having a nominal voltage of approximately 3.6V and an impedance of approximately ≤13 mΩ, and a set of battery pack terminals electrically connectable to the set of tool terminals. The battery pack has a nominal voltage of at least approximately 54V and the brushless motor is operable under load to output a power of between approximately 3000 W and approximately 5000 W.

Implementations may include one or more of the following features. For example, the battery pack may define a volume of the battery pack of up to about $1.0 \times 10^6$ mm$^3$. The set of battery cells may include 21700-model battery cells.

In some example implementations, the set of battery cells may include at least 20 battery cells each having a nominal voltage of approximately 3.6V and the battery pack may have a nominal voltage of at least approximately 72V In some example implementations, the set of battery cells may include at least 30 battery cells each having a nominal voltage of approximately 3.6V and the battery pack may have a nominal voltage of approximately 54V to approximately 108V.

In some example implementations, at least a portion of the battery cells may be connected in series.

In some example implementations, the battery cells may include a first string of at least 15 battery cells, each battery cell having a nominal voltage of approximately 3.6V, with the at least 15 battery cells connected in series. The battery cells may include a second string of at least 15 battery cells, each battery cell having a nominal voltage of approximately 3.6V, with the at least 15 battery cells connected in series. The first string of battery cells may be connected in parallel to the second string of battery cells.

In some implementations, the battery cells may include a first string of at least 15 battery cells, each battery cell having a nominal voltage of approximately 3.6V, with the at least 15 battery cells connected in series. The battery cells may include a second string of at least 15 battery cells, each battery cell having a nominal voltage of approximately 3.6V, with the at least 15 battery cells connected in series. The battery cells may include a third string of at least 15 battery cells, each battery cell having a nominal voltage of approximately 3.6V, with the at least 15 battery cells connected in series. The first string of battery cells, the second string of battery cells, and the third string of battery cells may be connected in parallel.

In some implementations, the power tool system may include a first battery pack and a second battery pack. The first battery pack may include a first battery pack housing that is operably connectable to the battery pack receptacle on the tool housing. The first battery pack may include a set of battery cells disposed in the first battery pack housing, the set of battery cells including at least 15 battery cells each having a nominal voltage of approximately 3.6V and an impedance of approximately ≤13 mΩ, and a set of first battery pack terminals electrically connectable to the set of tool terminals, where the first battery pack may have a nominal voltage of at least approximately 54V. The second battery pack may include a second battery pack housing that is operably connectable to the battery pack receptacle on the tool housing, the second battery pack includes a set of battery cells disposed in the second battery pack housing, the set of battery cells including at least 15 battery cells each having a nominal voltage of approximately 3.6V and an impedance of ≤13 mΩ, and a set of second battery pack terminals electrically connectable to the set of tool terminals, with the second battery pack having a nominal voltage of at least approximately 54V. In some implementations, the first battery pack may be electrically connected in parallel to the second battery pack. In some implementations, the first battery pack and the second battery pack may be electrically connected in series. In some implementations, the set of battery cells in the first battery pack and the set of battery cells in the second battery pack may include 21700-model battery cells.

In some implementations, the power tool may be a concrete saw. The outer diameter of the stator of the brushless motor may be approximately 61 mm and the stack length of the brushless motor may be approximately 60 mm. The brushless motor may be operable under load to output a power of approximately 3000 W.

In some implementations, the brushless motor may be operable under load to output a power of greater than approximately 5000 W.

In another general aspect, a power tool system includes a power tool having a tool housing. The tool housing includes a battery pack receptacle and the battery pack receptacle includes a set of tool terminals. The power tool includes a brushless motor is disposed in the tool housing. The brushless motor includes an output shaft operably coupled to drive a tool element, a stator having an outer diameter of approximately 60 mm to approximately 80 mm, and a stack length of approximately 75% to approximately 125% of the outer diameter of the stator. The power tool includes a controller disposed in the tool housing operably connected to the set of tool terminals and to the brushless motor to control power delivery to the brushless motor. The power tool system includes a battery pack. The battery pack includes a battery pack housing operably connectable to the battery pack receptacle on the tool housing, a set of battery cells disposed in the battery pack housing, the set of battery cells including at least 20 battery cells each having a nominal voltage of approximately 3.6V and an impedance of approximately ≤20 mΩ, and a set of battery pack terminals electrically connectable to the set of tool terminals. The battery pack has a nominal voltage of at least approximately 54V, and the brushless motor is operable under load to output a power of between approximately 3000 W and approximately 5000 W.

Implementations may include one or more of the following features. For example, the set of battery cells may include 21700-model battery cells.

In some implementations, the battery pack may have a nominal voltage of at least approximately 72V.

In some implementations, the set of battery cells may include at least 30 battery cells each having a nominal voltage of approximately 3.6V and the battery pack may have a nominal voltage of approximately 54V to approximately 108V.

In some implementations, at least a portion of the battery cells may be connected in series.

In some implementations, the battery cells may include a first string of at least 20 battery cells, each battery cell having a nominal voltage of approximately 3.6V, with the at least 20 battery cells connected in series. The battery cells may include a second string of at least 20 battery cells, each battery cell having a nominal voltage of approximately 3.6V, with the at least 20 battery cells connected in series. The first string of battery cells may be connected in parallel to the second string of battery cells.

In some implementations, the battery cells may include a first string of at least 20 battery cells, each battery cell having a nominal voltage of approximately 3.6V, with the at least 20 battery cells connected in series, a second string of at least 20 battery cells, each battery cell having a nominal voltage of approximately 3.6V, with the at least 20 battery cells connected in series, and a third string of at least 20 battery cells, each battery cell having a nominal voltage of approximately 3.6V, with the at least 20 battery cells connected in series. The first string of battery cells, the second string of battery cells, and the third string of battery cells may be connected in parallel.

In some implementations, the power tool may include a first battery pack and a second battery pack. The first battery pack may include a first battery pack housing that is operably connectable to the battery pack receptacle on the tool housing. The first battery pack may include a set of battery cells disposed in the first battery pack housing, the set of battery cells including at least 20 battery cells each having a nominal voltage of approximately 3.6V and an impedance of approximately ≤20 mΩ, and a set of first battery pack terminals electrically connectable to the set of tool terminals. The first battery pack may have a nominal voltage of at least approximately 54V. The second battery pack may include a second battery pack housing that is operably connectable to the battery pack receptacle on the tool housing. The second battery pack may include a set of battery cells disposed in the second battery pack housing, the set of battery cells including at least 20 battery cells each having a nominal voltage of approximately 3.6V and an impedance of approximately ≤20 mΩ, and a set of second battery pack terminals electrically connectable to the set of tool terminals. The second battery pack may have a nominal voltage of at least approximately 54V. In some implementations, the first battery pack may be electrically connected in parallel to the second battery pack. In some implementations, the first battery pack and the second battery pack may be electrically connected in series.

In some implementations, the set of battery cells in the first battery pack and the set of battery cells in the second battery pack may include 21700-model battery cells.

In some implementations, the power tool may be a concrete saw. The outer diameter of the stator of the brushless motor may be approximately 61 mm and the stack length of the brushless motor may be approximately 60 mm. The brushless motor may be operable under load to output a power of approximately 3000 W.

In some implementations, the brushless motor may be operable under load to output a power of greater than approximately 5000 W.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machinereadable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a readonly memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A power tool system, comprising:
a power tool, the power tool including
a tool housing, the tool housing including a battery pack receptacle, the battery pack receptacle including a set of tool terminals;

a brushless motor disposed in the tool housing, the brushless motor including:
an output shaft operably coupled to drive a tool element,
a stator having an outer diameter of approximately 60 mm to approximately 86 mm, and
a rotor rotatably disposed with respect to the stator and including a rotor shaft and a plurality of magnets, wherein a total weight of the motor is in the range of approximately 750 grams to approximately 1800 grams, a torque output of the motor is in the range of 1.8 N·m to 4 N·m, and an impedance of the motor is no greater than 0.012 Ohms;
a controller disposed in the tool housing operably connected to the set of tool terminals and to the brushless motor to control power delivery to the brushless motor; and a battery pack, the battery pack including
a battery pack housing operably connectable to the battery pack receptacle on the tool housing,
a set of battery cells disposed in the battery pack housing, the set of battery cells including at least 20 battery cells each having a nominal voltage of approximately 3.6V and an impedance of less than or equal to approximately 20 mΩ, and
a set of battery pack terminals electrically connectable to the set of tool terminals, wherein
the battery pack has a nominal voltage of at least approximately 54V, and
the brushless motor is operable under load to output a power of between approximately 3000 W and approximately 5000 W.

2. The power tool system of claim 1, wherein the set of battery cells comprises 21700-model battery cells.

3. The power tool system of claim 1, wherein the battery pack has a nominal voltage of at least approximately 72V.

4. The power tool system of claim 1, wherein:
the set of battery cells includes at least 30 battery cells each having a nominal voltage of approximately 3.6V; and
the battery pack has a nominal voltage of approximately 54V to approximately 108V.

5. The power tool system of claim 1, wherein at least a portion of the battery cells are connected in series.

6. The power tool system of claim 5, wherein the battery cells include:
a first string of at least 20 battery cells, each battery cell in the first string having a nominal voltage of approximately 3.6V, the first string of at least 20 battery cells connected in series; and
a second string of at least 20 battery cells, each battery cell in the second string having a nominal voltage of approximately 3.6V, the second string of at least 20 battery cells connected in series, wherein the first string of battery cells is connected in parallel to the second string of battery cells.

7. The power tool system of claim 5, wherein the battery cells include:
a first string of at least 20 battery cells, each battery cell in the first string having a nominal voltage of approximately 3.6V, the first string of at least 20 battery cells connected in series;
a second string of at least 20 battery cells, each battery cell in the second string having a nominal voltage of approximately 3.6V, the second string of at least 20 battery cells connected in series; and
a third string of at least 20 battery cells, each battery cell in the third string having a nominal voltage of approximately 3.6V, the third string of at least 20 battery cells connected in series, wherein the first string of battery cells, the second string of battery cells, and the third string of battery cells are connected in parallel.

8. The power tool system of claim 1, wherein:
the battery pack is a first battery pack, the power tool system further comprising:
a second battery pack that includes a second battery pack housing that is operably connectable to the battery pack receptacle on the tool housing, the second battery pack includes a second set of battery cells disposed in the second battery pack housing, the second set of battery cells including at least 20 battery cells each having a nominal voltage of approximately 3.6V and an impedance of less than or equal to approximately 20 mΩ, and a set of second battery pack terminals electrically connectable to the set of tool terminals, the second battery pack having a nominal voltage of at least approximately 54V.

9. The power tool system of claim 8, wherein the first battery pack is electrically connected in parallel to the second battery pack.

10. The power tool system of claim 8, wherein the first battery pack and the second battery pack are electrically connected in series.

11. The power tool system of claim 8, wherein the set of battery cells in the first battery pack and the second set of battery cells in the second battery pack comprises 21700-model battery cells.

12. The power tool system of claim 1, wherein:
the power tool is a concrete saw;
the outer diameter of the stator of the brushless motor is approximately 61 mm and a stack length of the brushless motor is approximately 60 mm; and
the brushless motor is operable under load to output a power of approximately 3000 W.

13. The power tool system of claim 1, wherein the brushless motor is operable under load to output a power of greater than approximately 5000 W.

* * * * *